United States Patent
Okamoto et al.

(10) Patent No.: US 8,966,920 B2
(45) Date of Patent: Mar. 3, 2015

(54) REFRIGERATION SYSTEM

(75) Inventors: Masakazu Okamoto, Osaka (JP); Eiji Kumakura, Osaka (JP); Masanori Ukibune, Osaka (JP)

(73) Assignee: Daikin Industries, Ltd., Osaka-Shi (JP)

( * ) Notice: Subject to any disclaimer, the term of this patent is extended or adjusted under 35 U.S.C. 154(b) by 365 days.

(21) Appl. No.: 13/638,089

(22) PCT Filed: Mar. 25, 2011

(86) PCT No.: PCT/JP2011/001782
§ 371 (c)(1),
(2), (4) Date: Sep. 28, 2012

(87) PCT Pub. No.: WO2011/121963
PCT Pub. Date: Oct. 6, 2011

(65) Prior Publication Data
US 2013/0025307 A1    Jan. 31, 2013

(30) Foreign Application Priority Data

Mar. 31, 2010   (JP) .................... 2010-083499

(51) Int. Cl.
*F25B 9/06* (2006.01)
*F25B 49/02* (2006.01)
*F25B 1/04* (2006.01)
*F25B 13/00* (2006.01)
*F25B 9/00* (2006.01)

(52) U.S. Cl.
CPC ............... *F25B 9/06* (2013.01); *F25B 49/025* (2013.01); *F25B 1/04* (2013.01); *F25B 13/00* (2013.01); *F25B 2313/02742* (2013.01); *F25B 2600/021* (2013.01); *Y02B 30/741* (2013.01); *F25B 9/008* (2013.01); *F25B 2309/061* (2013.01)

USPC .......................................... 62/228.4; 62/401

(58) Field of Classification Search
CPC .......... F25B 9/06; F25B 11/02; F25B 49/022; F25B 2400/14; F25B 2400/141; F25B 2600/025
USPC ................... 62/87, 228.4, 401, 402
See application file for complete search history.

(56) References Cited

U.S. PATENT DOCUMENTS

2006/0254276 A1   11/2006  Sato et al.
2007/0101735 A1    5/2007  Matsui et al.
(Continued)

FOREIGN PATENT DOCUMENTS

| EP | 1793182 A2 | 6/2007 |
|----|------------|--------|
| JP | 2006-250075 A | 9/2006 |
| JP | 2007-240120 A | 9/2007 |
| JP | 4077868 B2 | 4/2008 |
| JP | 2008-180462 A | 8/2008 |

(Continued)

*Primary Examiner* — Marc Norman
(74) *Attorney, Agent, or Firm* — Birch, Stewart, Kolasch & Birch, LLP

(57) ABSTRACT

A refrigeration system includes a refrigerant circuit including a compressor and an expander which expands a refrigerant and generates power, for performing a refrigeration cycle. The refrigeration system includes a compressor control section and an expander control section which, when an operation stop signal is output during operation, reduces a rotational speed of the compressor and increases a rotational speed of the expander to increase the ratio of the rotational speed of the expander to the rotational speed of the compressor.

8 Claims, 10 Drawing Sheets

(56) References Cited

U.S. PATENT DOCUMENTS

| | | | |
|---|---|---|---|
| 2009/0007590 A1* | 1/2009 | Sakitani et al. | 62/513 |
| 2009/0031738 A1* | 2/2009 | Tamura et al. | 62/196.1 |
| 2010/0101268 A1 | 4/2010 | Sakitani et al. | |
| 2011/0283723 A1* | 11/2011 | Yakumaru | 62/126 |

FOREIGN PATENT DOCUMENTS

| | | |
|---|---|---|
| JP | 2008-224053 A | 9/2008 |
| JP | 2008-292047 A | 12/2008 |
| WO | WO 2006/120922 A1 | 11/2006 |

* cited by examiner

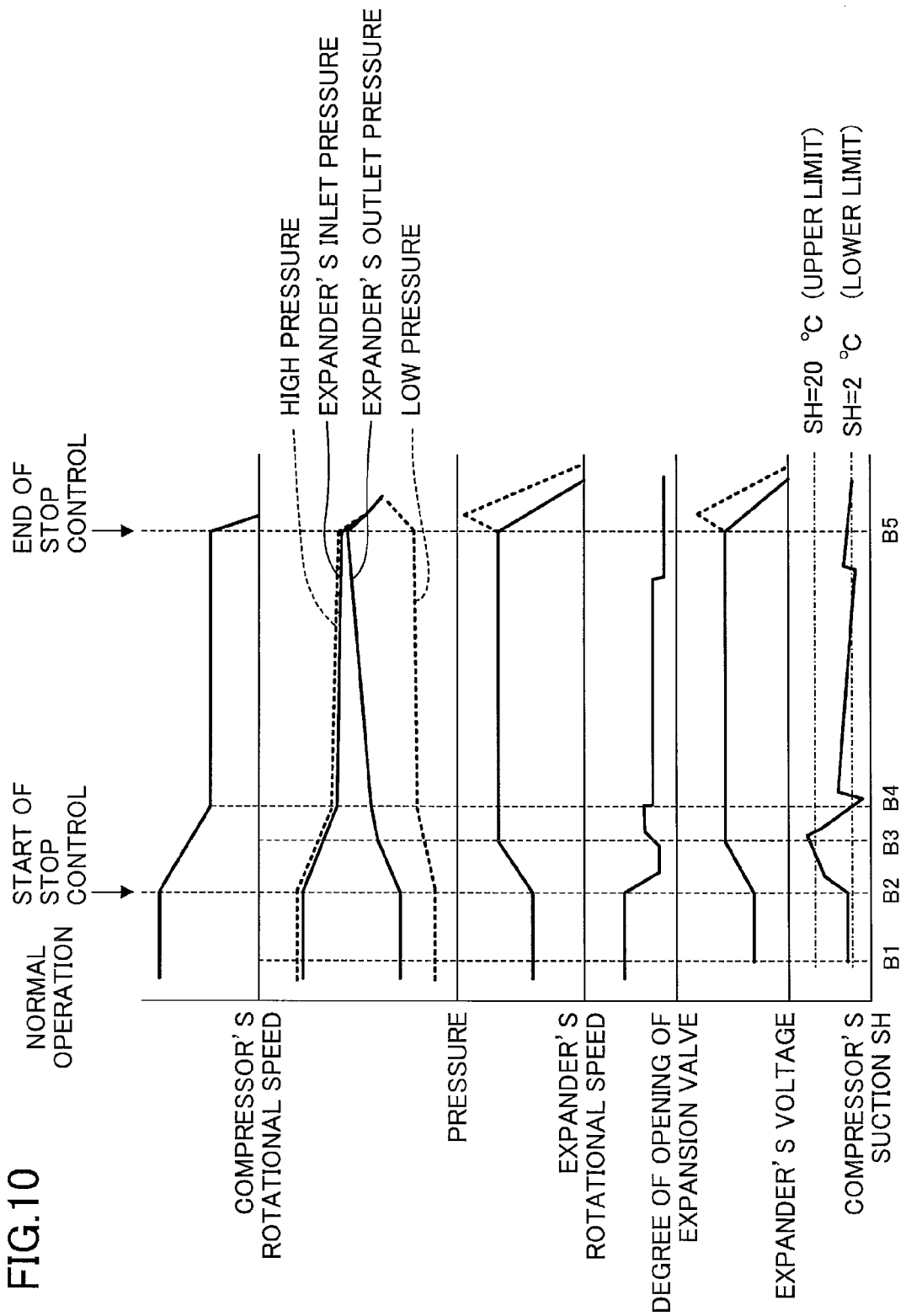

REFRIGERATION SYSTEM

TECHNICAL FIELD

The present disclosure relates to refrigeration systems having a compressor and an expander as separate components, and specifically relates to stop control of the expander.

BACKGROUND ART

A refrigeration system having a compressor which compresses a refrigerant and an expander which expands the refrigerant as separate components is disclosed, for example, in Patent Document 1. This refrigeration system includes a refrigerant circuit in which the compressor and the expander are connected to each other to circulate the refrigerant and run a refrigeration cycle. The compressor includes a compression mechanism, and an electric motor for driving the compression mechanism. The expander includes an expansion mechanism which generates rotational power as the refrigerant expands, and an electric generator connected to the expansion mechanism via an output shaft. The electric generator is driven by the rotational power from the expansion mechanism, and generates electricity. The generated electric power is supplied to the electric motor of the compressor and is used to drive the compression mechanism.

CITATION LIST

Patent Document

Patent Document 1: Japanese Patent Publication No. 2008-224053

SUMMARY OF THE INVENTION

Technical Problem

In the above refrigeration system, even if the compressor is stopped in a stop operation, the expander may rotate at a high speed and be damaged. Specifically, even if the compressor is stopped, the pressure of the refrigerant circuit is not immediately equalized, and therefore, a pressure difference remains between the inlet side and the outlet side of the expander. This pressure difference makes the expander rotate at a high speed (free rotation), and may cause damage to the expander at worse. Further, the electric generator generates electricity as the expander rotates, but because the compressor is stopped, the generated electricity is not used and causes a significant increase in voltage. This may cause damage to electronic components, etc.

The present disclosure was made in view of the above problems, and it is an objective of the invention to prevent the expander from rotating at a high speed when the operation is stopped.

Solution to the Problem

To solve the above problems, a difference between an inlet pressure and an outlet pressure of the expander (30) is reduced before the compressor (20) is stopped in a stop operation in the present disclosure.

Specifically, the first aspect of the present disclosure is directed to a refrigeration system including a refrigerant circuit (11) including a compressor (20) and an expander (30) which expands a refrigerant and generates power, for circulating the refrigerant and performing a refrigeration cycle. The refrigeration system of the present disclosure includes: a stop instruction section (113) which outputs an operation stop signal under a predetermined condition; and an equipment control section (111, 112) which, when the operation stop signal is output from the stop instruction section (113), controls a rotational speed of at least one of the compressor (20) or the expander (30) such that a ratio of a rotational speed of the expander (30) to a rotational speed of the compressor (20) will be a second ratio higher than a first ratio that is a ratio of a rotational speed of the expander (30) to a rotational speed of the compressor (20) in an operation before the output of the operation stop signal from the stop instruction section (113), and thereafter stops the compressor (20) and the expander (30).

In the first aspect of the present disclosure, the ratio of the rotational speed of the expander (30) to the rotational speed of the compressor (20) is increased when the operation stop signal is output. Thus, the high pressure decreases and the low pressure increases in the refrigerant circuit (11). As a result, a difference between the inlet pressure and the outlet pressure in the expander (30) decreases. The compressor (20) and the expander (30) are stopped after this decrease in the pressure difference. Thus, it is possible to prevent the situation in which the expander (30) is accelerated by its own pressure difference and is rotated at a high speed.

According to the second aspect of the present disclosure, in the first aspect of the present disclosure, the equipment control section (111, 112) is configured to perform rotational speed control in which the rotational speed of the compressor (20) is reduced and the rotational speed of the expander (30) is maintained or increased when the operation stop signal is output from the stop instruction section (113), and thereafter stop the compressor (20) and the expander (30).

In the second aspect of the present disclosure, the rotational speed of the compressor (20) is reduced and the rotational speed of the expander (30) is maintained, or the rotational speed of the compressor (20) is reduced and the rotational speed of the expander (30) is increased, thereby increasing the ratio of the rotational speed of the expander (30) to the rotational speed of the compressor (20).

According to the third aspect of the present disclosure, in the first aspect of the present disclosure, the equipment control section (111, 112) is configured to perform rotational speed control in which the rotational speed of the compressor (20) is maintained and the rotational speed of the expander (30) is increased when operation stop signal is output from the stop instruction section (113), and thereafter stop the compressor (20) and the expander (30).

In the third aspect of the present disclosure, the rotational speed of the compressor (20) is maintained and the rotational speed of the expander (30) is increased, thereby increasing the ratio of the rotational speed of the expander (30) to the rotational speed of the compressor (20).

The fourth aspect of the present disclosure, in any one of the first to third aspects of the present disclosure, the equipment control section (111, 112) is configured to control the rotational speed of at least one of the compressor (20) or the expander (30) when the operation stop signal is output from the stop instruction section (113), and thereafter stop the compressor (20) and the expander (30) when a difference between an inlet pressure and an outlet pressure of the refrigerant in the expander (30) reaches a predetermined value or lower.

In the fourth aspect of the present disclosure, the rotational speeds of the compressor (20) and the expander (30) are controlled, and thereafter when the pressure difference in the expander (30) is decreased to a predetermined value, the compressor (20) and the expander (30) are stopped.

The fifth aspect of the present disclosure, in any one of the first to fourth aspects of the present disclosure, the refrigerant circuit (11) includes a flow rate adjusting valve (48) provided at an inlet-side pipe or an outlet-side pipe of the expander (30), and the refrigeration system includes a valve control section (114) which reduces a degree of opening of the flow rate adjusting valve (48) when the operation stop signal is output from the stop instruction section (113).

If the flow rate adjusting valve (48) is provided at an inlet-side pipe of the expander (30) in the fifth aspect of the present disclosure, the ratio between the rotational speeds of the compressor (20) and the expander (30) is increased, whereas the degree of opening of the flow rate adjusting valve (48) is reduced. Thus, the difference between the inlet pressure and the outlet pressure in the expander (30) is reduced more than the difference between the high pressure and the low pressure in the refrigerant circuit (11) is reduced. Specifically, as the degree of opening of the flow rate adjusting valve (48) is reduced, the high pressure on the refrigerant circuit (11) is not much reduced, but the inlet pressure of expander (30) is significantly reduced. Thus, the pressure difference in the expander (30) is instantaneously reduced. Accordingly, since the pressure difference in the expander (30) can be reduced without a sudden increase of the low pressure in the refrigerant circuit (11), it is possible to prevent an increase in the amount of the refrigerant which is not completely evaporated by the evaporator and flows into the compressor (20). As a result, it is possible to avoid so-called liquid back-flow in the compressor (20).

If the flow rate adjusting valve (48) is provided at the outlet-side pipe of the expander (30) in the fifth aspect of the present disclosure, the ratio between the rotational speeds of the compressor (20) and the expander (30) is increased, whereas the degree of opening of the flow rate adjusting valve (48) is reduced. Thus, the difference between the inlet pressure and the outlet pressure in the expander (30) is reduced more than the difference between the high pressure and the low pressure in the refrigerant circuit (11) is reduced, as shown in FIG. 10. Specifically, as the degree of opening of the flow rate adjusting valve (48) is reduced, the low pressure in the refrigerant circuit (11) is not much reduced, but the outlet pressure of the expander (30) is significantly reduced. Thus, in this case as well, the pressure difference in the expander (30) is instantaneously reduced. Further, in this case as well, the pressure difference in the expander (30) can be reduced without a sudden increase of the low pressure in the refrigerant circuit (11). Therefore, it is possible to prevent an increase in the amount of the refrigerant which is not completely evaporated by the evaporator and flows into the compressor (20). As a result, it is possible to avoid so-called liquid back-flow in the compressor (20).

According to the sixth aspect of the present disclosure, in any one of the first to fourth aspects of the present disclosure, the refrigerant circuit (11) includes a bypass pipe (46) provided with an open/close valve (47) and connecting between an inlet-side pipe and an outlet-side pipe of the expander (30), and the refrigeration system includes a valve control section (114) which opens the open/close valve (47) when the operation stop signal is output from the stop instruction section (113).

In the sixth aspect of the present disclosure, the inlet-side pipe (the inflow side) and the outlet-side pipe (the outflow side) of the expander (30) communicate with each other when the open/close valve (45) is opened. Thus, the difference between the inlet pressure and the outlet pressure of the expander (30) instantaneously decreases.

According to the seventh aspect of the present disclosure, in any one of the first to fourth aspects of the present disclosure, the refrigerant circuit (11) includes a bypass pipe (44) provided with an open/close valve (45) and connecting between an outlet-side pipe and a suction-side pipe of the compressor (20), and the refrigeration system includes a valve control section (114) which opens the open/close valve (45) when the operation stop signal is output from the stop instruction section (113).

In the seventh aspect of the present disclosure, the outlet side and the inlet side of the compressor (20), that is, the highest pressure portion and the lowest pressure portion in the refrigerant circuit (11) communicate with each other when the open/close valve (45) is opened. Thus, the difference between the high pressure and the low pressure in the refrigerant circuit (11) instantaneously decreases. Accordingly, the difference between the inlet pressure and the outlet pressure of the expander (30) instantaneously decreases, as well.

According to the eighth aspect of the present disclosure, in any one of the first to seventh aspects of the present disclosure, the compressor (20) includes a compression mechanism (21) for compressing the refrigerant, and an electric motor (23) for driving the compression mechanism (21). The expander (30) includes an expansion mechanism (31) which expands the refrigerant having flowed into the expansion mechanism (31) and generates power, and an electric generator (33) coupled to the expansion mechanism (31) with an output shaft (32), and driven by the power generated by the expansion mechanism (31). Further, the electric generator (33) is configured to supply generated electric power to the electric motor (23) of the compressor (20).

In the eighth aspect of the present disclosure, the electric generator (33) is driven by the power generated by the expansion mechanism (31) to generate electric power. The electric power generated is supplied to the electric motor (23) of the compressor (20).

Advantages of the Invention

As described above, according to the present disclosure, a ratio of a rotational speed of the expander (30) to a rotational speed of the compressor (20) in a normal operation before output of a operation stop signal is called a first ratio, and a rotational speed of at least one of the compressor (20) or the expander (30) is controlled when an operation stop signal is output such that the above rotational speed ratio will be a second ratio higher than the first ratio (stop control). Thus, it is possible to reduce the pressure difference in the expander (30) more than in the case where the stop control is performed while maintaining a similar rotational speed ratio before the output of the operation stop signal. Accordingly, it is possible to avoid the situation where the expander (30) is rotated at a high speed in the stop operation due to the pressure difference of its own. As a result, it is possible to prevent the expander (30) from being damaged due to the high speed rotation.

According to the second and third aspects of the present disclosure, it is possible to provide control, in a concrete manner, for increasing the ratio between the rotational speeds of the compressor (20) and the expander (30) from the first ratio to the second ratio. Particularly in the case where the rotational speed of the compressor (20) is reduced and the rotational speed of the expander (30) is increased, the pressure difference in the expander (30) can be reduced faster, compared to the case where only the rotational speed of the compressor (20) is reduced, or to the case where only the rotational speed of the expander (30) is increased. As a result, it is possible to reduce the time necessary for the stop control.

According to the fourth aspect of the present disclosure, the rotational speed of at least one of the compressor (20) of the expander (30) is controlled, and the compressor (20) and the expander (30) are stopped after the pressure difference in the expander (30) is reduced to a predetermined value. Thus, the pressure difference of the expander (30) can be reduced to a pressure difference at which the expander (30) is not accelerated nor rotated at a high speed with reliability. That is, the pressure of the refrigerant circuit (11) can be almost equalized with reliability. As a result, it is possible to reliably prevent the expander (30) from being accelerated and rotated at a high speed due to the pressure difference in the stop operation.

According to the fifth aspect of the present disclosure, the flow rate adjusting valve (48) is provided at the inlet-side pipe or the outlet-side pipe of the expander (30), and the degree of opening of the flow rate adjusting valve (48) is reduced when the operation stop signal is output. Due to this structure, it is possible to reduce the pressure difference in the expander (30) instantaneously, while preventing so-called liquid back-flow in the compressor (20). As a result, it is possible to reduce the time necessary for the stop operation, while ensuring the reliability of the refrigeration system.

According to the sixth aspect of the present disclosure, the rotational speeds of the compressor (20) and the expander (30) are controlled such that the ratio between the rotational speeds of the compressor (20) and the expander (30) will be the second ratio, and the open/close valve (47) is opened, when the operation stop signal is output. Due to this structure, it is possible to reduce the pressure difference in the expander (30) instantaneously. That is, the pressure equalization can be enhanced in the refrigerant circuit (11). As a result, it is possible to further reduce the time necessary for the stop operation.

According to the seventh aspect of the present disclosure, the rotational speeds of the compressor (20) and the expander (30) are controlled such that the ratio between the rotational speeds of the compressor (20) and the expander (30) will be the second ratio, and the open/close valve (45) is opened, when the operation stop signal is output. Due to this structure, the difference between the high pressure and the low pressure in the refrigerant circuit (11) can be instantaneously reduced, and the difference between the inlet pressure and the outlet pressure in the expander (30) can also be instantaneously reduced. That is, the pressure equalization can be enhanced in the refrigerant circuit (11). As a result, it is possible to further reduce the time necessary for the stop operation.

According to the eighth aspect of the present disclosure, it is possible to prevent electronic equipment from being damaged by a voltage increase in the power supply circuit (100) due to a situation where electric power generated by the electric generator (33) as a result of high speed rotation of the expander (30) is not used in the power supply circuit (100). Accordingly, it is possible to provide a highly reliable refrigeration system.

BRIEF DESCRIPTION OF THE DRAWINGS

FIG. 10 is a time chart showing a stop control operation according to the third embodiment.

DESCRIPTION OF EMBODIMENTS

Embodiments of the present disclosure will be described in detail below based on the drawings. The foregoing embodiments are merely preferred examples in nature, and are not intended to limit the scope, applications, and use of the invention.

First Embodiment

Figure 1:
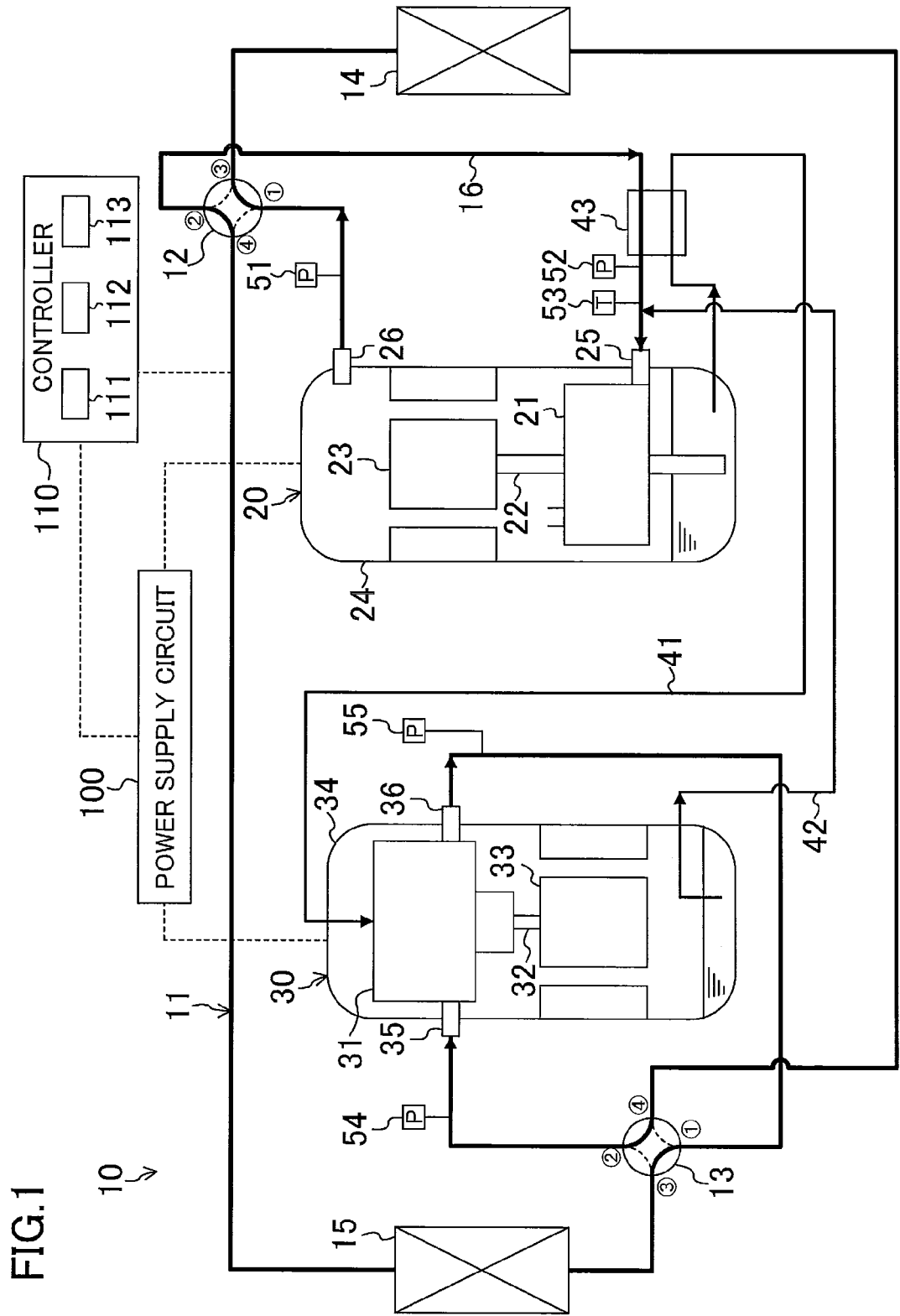
FIG. 1 is a circuit diagram illustrating a configuration of an air conditioner according to the first embodiment.

The first embodiment of the present disclosure will be described. The present embodiment is directed to an air conditioner (10) configured by a refrigeration system according to the present disclosure. As shown in FIG. 1, the air conditioner (10) of the present embodiment includes a refrigerant circuit (11), a power supply circuit (100), and a controller (110).

<Configuration of Refrigerant Circuit>

A configuration of the refrigerant circuit (11) will be described with reference to FIG. 1.

A compressor (20), an expander (30), an outdoor heat exchanger (14), an indoor heat exchanger (15), a first four-way switching valve (12), and a second four-way switching valve (13) are connected to the refrigerant circuit (11). Further, the refrigerant circuit (11) includes an oil supply pipe (41), an oil return pipe (42), and a cooling heat exchanger (43). The refrigerant circuit (11) is filled with carbon dioxide ($CO_2$) as a refrigerant, and performs a vapor compression refrigeration cycle by circulating the refrigerant. Further, in the refrigeration cycle performed in the refrigerant circuit (11), high pressure is set to a value higher than a critical pressure of the carbon dioxide as the refrigerant.

A discharge pipe (26) of the compressor (20) is connected to a first port of the first four-way switching valve (12), and a suction pipe (25) of the compressor (20) is connected to a second port of the first four-way switching valve (12). An outflow pipe (36) of the expander (30) is connected to a first port of the second four-way switching valve (13), and an inflow pipe (35) of the expander (30) is connected to a second port of the second four-way switching valve (13). One end of the outdoor heat exchanger (14) is connected to a third port of the first four-way switching valve (12), and the other end of the outdoor heat exchanger (14) is connected to a fourth port of the second four-way switching valve (13). One end of the indoor heat exchanger (15) is connected to a third port of the second four-way switching valve (13), and the other end of the indoor heat exchanger (15) is connected to a fourth port of the first four-way switching valve (12). In the refrigerant circuit (11), a pipe connecting the suction pipe (25) of the compressor (20) and the second port of the first four-way switching valve (12) forms a suction-side pipe (16).

The outdoor heat exchanger (14) is an air-heat exchanger for exchanging heat between the refrigerant and the outdoor air. The indoor heat exchanger (15) is an air-heat exchanger for exchanging heat between the refrigerant and the indoor air. Each of the first four-way switching valve (12) and the second four-way switching valve (13) is configured to switch between a first state (i.e., the state indicated by solid line in FIG. 1) in which the first port and the third port communicate with each other and the second port and the fourth port communicate with each other, and a second state (i.e., the state indicated by broken line in FIG. 1) in which the first port and the fourth port communicate with each other and the second port and the third port communicate with each other.

The compressor (20) is a so-called high-pressure domed hermetic compressor. This compressor (20) includes a compressor casing (24) in an elongated cylindrical shape. The compressor casing (24) houses a compression mechanism (21), an electric motor (23), and a driving shaft (22). The compression mechanism (21) forms a so-called rotary positive-displacement fluid machine. In the compressor casing (24), the electric motor (23) is located above the compression mechanism (21). The driving shaft (22) extends vertically, and couples the compression mechanism (21) and the electric motor (23) together.

The compressor casing (24) includes the suction pipe (25) and the discharge pipe (26). The suction pipe (25) penetrates the body of the compressor casing (24) near the bottom, and a terminal end of the suction pipe (25) is directly connected to the compression mechanism (21). The discharge pipe (26) penetrates a top portion of the compressor casing (24), and a starting end of the discharge pipe (26) is open to the space above the electric motor (23) in the compressor casing (24). The compression mechanism (21) is rotated by the electric motor (23), compresses the refrigerant sucked by the suction pipe (25), and discharges the refrigerant into the compressor casing (24).

Refrigeration oil as lubricating oil is stored in the bottom of the compressor casing (24). In the present embodiment, polyalkylene glycol (PAG) is used as the refrigeration oil. Although not shown, an oil supply passageway is formed in the driving shaft (22) along the axis of the driving shaft (22). This oil supply passageway is open at the lower end of the driving shaft (22). The lower end of the driving shaft (22) is immersed in the refrigeration oil. The refrigeration oil in the compressor casing (24) is supplied to the compression mechanism (21) through the oil supply passageway in the driving shaft (22).

The expander (30) includes an expander casing (34) having an elongated cylindrical shape. The expander casing (34) houses an expansion mechanism (31), an electric generator (33), and an output shaft (32). The expansion mechanism (31) forms a so-called rotary positive-displacement fluid machine. The expansion mechanism (31) will be described in detail later. In the expander casing (34), the electric generator (33) is placed below the expansion mechanism (31). The output shaft (32) vertically extends and couples the expansion mechanism (31) and the electric generator (33) together.

The expander casing (34) includes an inflow pipe (35) and an outflow pipe (36). Each of the inflow pipe (35) and the outflow pipe (36) penetrates the body of the expander casing (34) near the top. The terminal end of the inflow pipe (35) is directly connected to the expansion mechanism (31). The starting end of the outflow pipe (36) is directly connected to the expansion mechanism (31). The expansion mechanism (31) expands the refrigerant which flows in through the inflow pipe (35), and sends the expanded refrigerant to the outflow pipe (36). That is, the refrigerant passing through the expander (30) does not flow in the internal space of the expander casing (34), but passes only through the expansion mechanism (31). The electric generator (33) is rotated by the expansion of the refrigerant in the expansion mechanism (31), and generates electricity. That is, the power generated by the expansion of the refrigerant is used to drive the electric generator (33). Further, the electric generator (33) of the present embodiment forms a permanent magnet synchronous motor without an exciting portion, etc. In this permanent magnet synchronous motor, no exciting portion or coil is provided near the rotor. Thus, the weight of the electric generator as a whole is reduced, and power loss due to the exciting portion, etc. is avoided. Accordingly, the power generation efficiency is high.

The starting end of the oil supply pipe (41) is connected to the compressor (20), and the terminal end of the oil supply pipe (41) is connected to the expander (30). Specifically, the starting end of the oil supply pipe (41) penetrates a bottom portion of the compressor casing (24), and is open to the internal space of the compressor casing (24). The starting end of the oil supply pipe (41) is immersed in the refrigeration oil stored in the bottom of the compressor casing (24), and is open at approximately the same level as the lower end of the driving shaft (22). On the other hand, the terminal end of the oil supply pipe (41) is directly connected to the expansion mechanism (31) in the expander casing (34). The location at which the oil supply pipe (41) is connected to the expansion mechanism (31) will be described later. This oil supply pipe (41) forms an oil supply mechanism of the present embodiment. The refrigeration oil stored in the bottom of the compressor casing (24) is supplied to the expansion mechanism (31) through the oil supply pipe (41).

The cooling heat exchanger (43) is connected to the oil supply pipe (41) and the suction-side pipe (16). The cooling heat exchanger (43) exchanges heat between the refrigeration oil flowing in the oil supply pipe (41) and the refrigerant flowing in the suction-side pipe (16).

The starting end of the oil return pipe (42) is connected to the expander (30), and the terminal end of the oil return pipe (42) is connected to the suction-side pipe (16). Specifically, the starting end of the oil return pipe (42) penetrates a bottom portion of the expander casing (34), and is open to the internal space of the expander casing (34). The starting end of the oil return pipe (42) is open near the bottom of the expander casing (34). On the other hand, the terminal end of the oil return pipe (42) is connected to a portion of the suction-side pipe (16) on the downstream side of the cooling heat exchanger (43). In the expander (30), the refrigeration oil leaked from the expansion mechanism (31) accumulates in the expander casing (34). The refrigeration oil accumulated in the expander casing (34) is introduced into the suction-side pipe (16) through the oil return pipe (42), and is sucked into the compression mechanism (21) together with the refrigerant flowing in the suction-side pipe (16).

The refrigerant circuit (11) is provided with various sensors (51, 52, 53, 54, 55). Specifically, a high pressure sensor (51) which detects a pressure of the refrigerant discharged from the compressor (20) is provided on a pipe between the discharge pipe (26) of the compressor (20) and the first four-way switching valve (12). A low pressure sensor (52) and a suction temperature sensor (53) which respectively detect a pressure and a temperature of the refrigerant sucked into the compressor (20) are provided on the suction-side pipe (16). An inlet pressure sensor (54) which detects a pressure of the refrigerant flowing into the expander (30) (i.e., an inlet refrigerant) is provided on a pipe between the inflow pipe (35) of the expander (30) and the second four-way switching valve (13). An outlet pressure sensor (55) which detects a pressure of the refrigerant flowing out from the expander (30) (i.e., an outlet refrigerant) is provided on a pipe between the outflow pipe (36) of the expander (30) and the second four-way switching valve (13).

<Configuration of Expansion Mechanism>

A configuration of the expansion mechanism (31) will be described in detail with reference to FIG. 2 to FIG. 4.

Figure 2:
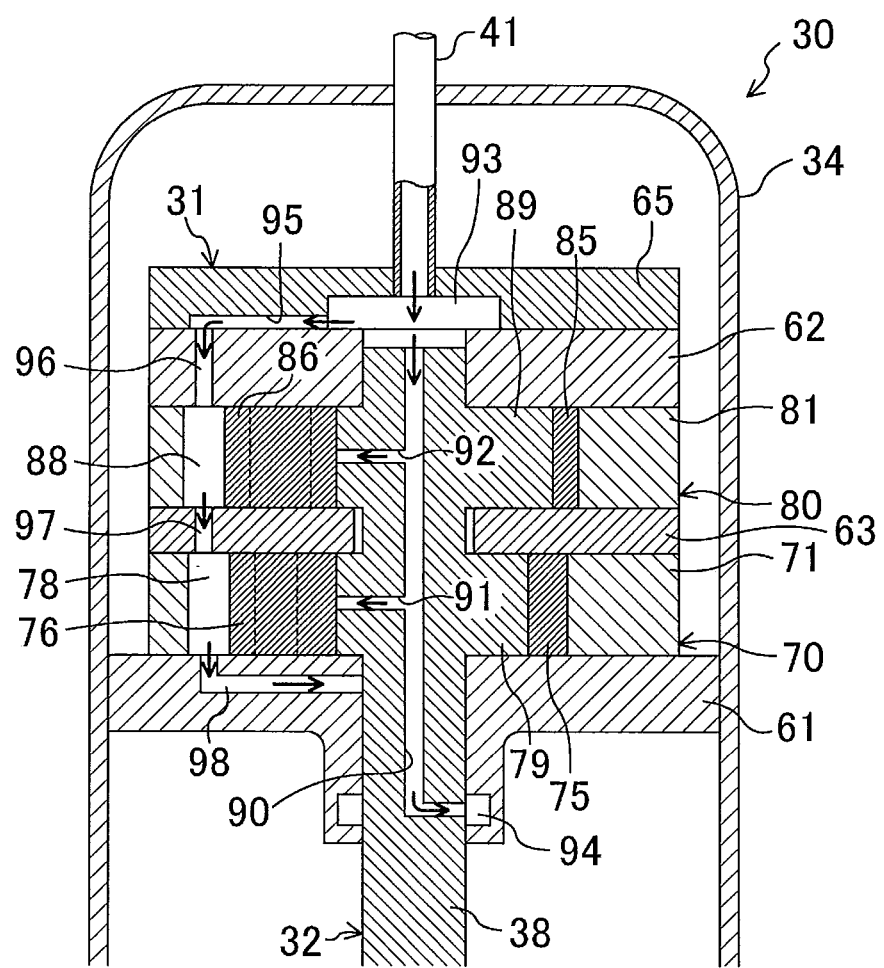
FIG. 2 is a longitudinal cross-sectional view of a main portion of an expander.

As shown in FIG. 2, two eccentric portions (79, 89) are formed at the top of the output shaft (32). The two eccentric portions (79, 89) have diameters larger than the diameter of a main shaft portion (38) of the output shaft (32), and one of the two eccentric portions (79, 89) located at the lower level is the first eccentric portion (79), and the other eccentric portion located at the upper level is the second eccentric portion (89). The first eccentric portion (79) and the second eccentric portion (89) are eccentric to the same direction. The outer diameter of the second eccentric portion (89) is larger than the outer diameter of the first eccentric portion (79). The eccentricity of the second eccentric portion (89) with respect to the axis of the main shaft portion (38) is greater than the eccentricity of the first eccentric portion (79) with respect to the axis of the main shaft portion (38).

The output shaft (32) has an oil supply passageway (90). The oil supply passageway (90) extends along the axis of the output shaft (32). One end of the oil supply passageway (90) is open at the top surface of the output shaft (32). The other end of the oil supply passageway (90) is bent at a right angle, then extends along the diameter of the output shaft (32), and is open at the outer periphery of the output shaft (32) at a location slightly below the first eccentric portion (79). The oil supply passageway (90) includes two branch passageways (91, 92) extending along the diameter of the output shaft (32). The first branch passageway (91) is open at the outer periphery of the first eccentric portion (79). The second branch passageway (92) is open at the outer periphery of the second eccentric portion (89).

The expansion mechanism (31) is a so-called rotary fluid machine of a swinging piston type. This expansion mechanism (31) includes two pairs of cylinders (71, 81) and pistons (75, 85). The expansion mechanism (31) also includes a front head (61), an intermediate plate (63), and a rear head (62).

In the expansion mechanism (31), the front head (61), the first cylinder (71), the intermediate plate (63), the second cylinder (81), the rear head (62), and an upper plate (65) are sequentially stacked from below upwards. In this state, the lower surface of the first cylinder (71) is closed by the front head (61), and the upper surface of the first cylinder (71) is closed by the intermediate plate (63). On the other hand, the lower surface of the second cylinder (81) is closed by the intermediate plate (63), and the upper surface of the second cylinder (81) is closed by the rear head (62). The inner diameter of the second cylinder (81) is larger than the inner diameter of the first cylinder (71).

The output shaft (32) penetrates the stack of the front head (61), the first cylinder (71), the intermediate plate (63), and the second cylinder (81). The first eccentric portion (79) of the output shaft (32) is located in the first cylinder (71), and the second eccentric portion (89) of the output shaft (32) is located in the second cylinder (81).

Figure 3:
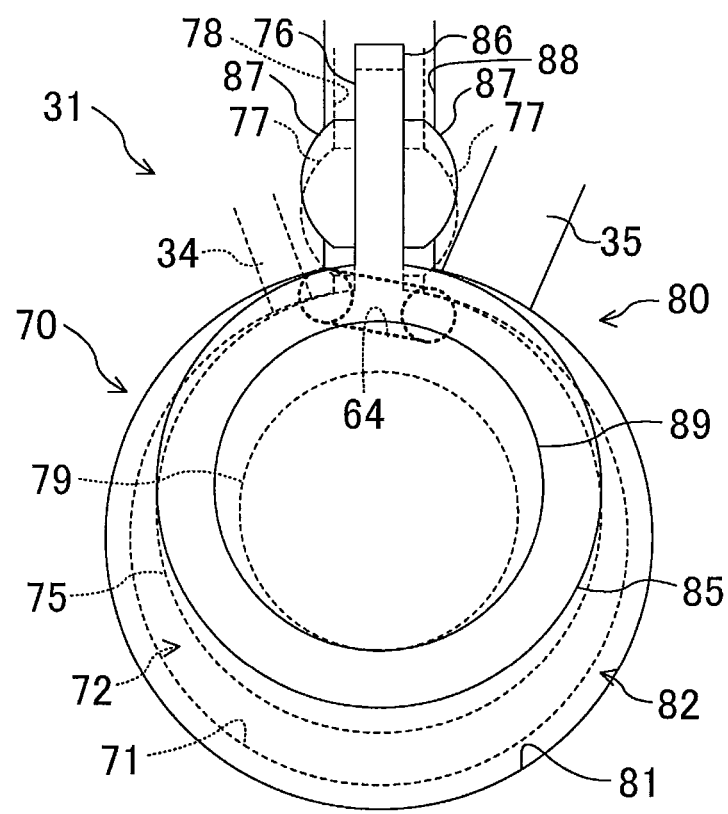
FIG. 3 is an enlarged view of a main portion of an expansion mechanism.
Figure 4:
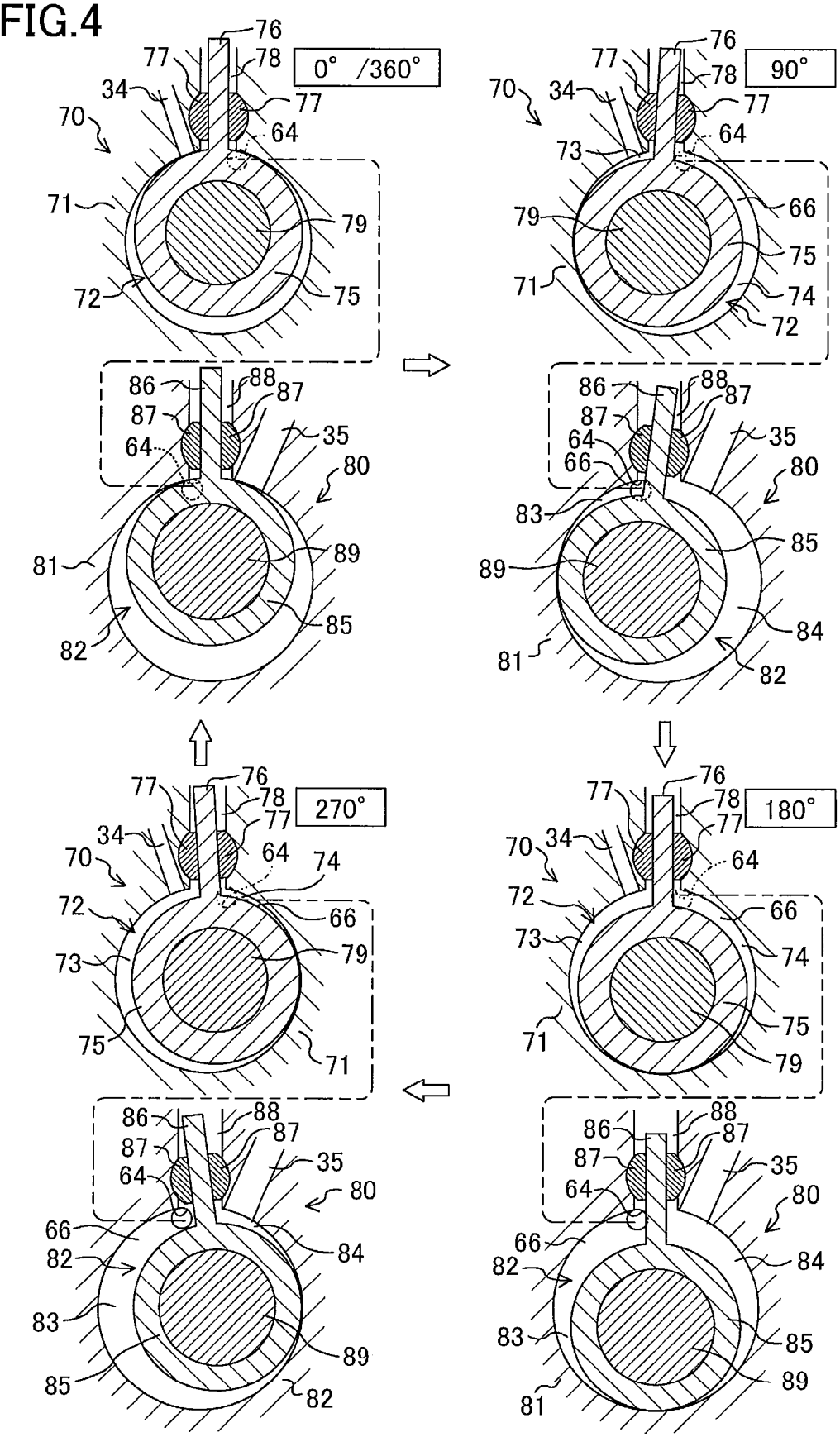
FIG. 4 shows transverse cross-sectional views of states of rotary mechanisms for every 90° rotational angle of an output shaft in the expansion mechanism.

As also shown in FIG. 3 and FIG. 4, the first piston (75) is provided in the first cylinder (71), and the second piston (85) is provided in the second cylinder (81). Each of the first and second pistons (75, 85) is in the shape of a ring or a cylinder. The outer diameter of the first piston (75) and the outer diameter of the second piston (85) are equal to each other. The inner diameter of the first piston (75) is approximately equal to the outer diameter of the first eccentric portion (79), and the inner diameter of the second piston (85) is approximately equal to the outer diameter of the second eccentric portion (89). The first eccentric portion (79) penetrates the first piston (75), and the second eccentric portion (89) penetrates the second piston (85).

The outer periphery of the first piston (75) is in slidable contact with the inner periphery of the first cylinder (71). One end surface of the first piston (75) is in slidable contact with the front head (61), and the other end surface of the first piston (75) is in slidable contact with the intermediate plate (63). In the first cylinder (71), a first fluid chamber (72) is formed between the inner periphery of the first cylinder (71) and the outer periphery of the first piston (75). On the other hand, the outer periphery of the second piston (85) is in slidable contact with the inner periphery of the second cylinder (81). One end surface of the second piston (85) is in slidable contact with the rear head (62), and the other end surface is in slidable contact with the intermediate plate (63). In the second cylinder (81), a second fluid chamber (82) is formed between the inner periphery of the second cylinder (81) and the outer periphery of the second piston (85).

The first and second pistons (75, 85) are respectively provided with, and continuous to, blades (76, 86). The blades (76, 86) are in the shape of plates extending in the radius direction of the pistons (75, 85), and project outward from the outer peripheries of the pistons (75, 85). The blade (76) of the first piston (75) is inserted in a bushing hole (78) of the first cylinder (71), and the blade (86) of the second piston (85) is inserted in a bushing hole (88) of the second cylinder (81). The bushing holes (78, 88) of the cylinders (71, 81) respectively go through the cylinders (71, 81) in the thickness direction of the cylinders (71, 81), and are open at the inner peripheries of the cylinders (71, 81), respectively.

Each of the cylinders (71, 81) includes a pair of bushings (77, 87). Each of the bushings (77, 87) is a small piece whose inner surface is flat and outer surface forms an arc. In each of the cylinders (71, 81), the pair of bushings (77, 87) are inserted in the bushing holes (78, 88) to sandwich the blades (76, 86). The inner surfaces of the bushings (77, 87) are in slidable contact with the blades (76, 86), and the outer surfaces of the bushings (77, 87) are slidable along the cylinder (71, 81). The blade (76, 86) continuous to the piston (75, 85) is supported on the cylinder (71, 81) with the bushings (77, 87) interposed therebetween, and is rotatable about the cylinder (71, 81) and movable forward and away from the cylinder (71, 81).

The first fluid chamber (72) in the first cylinder (71) is partitioned by the first blade (76) continuous to the first piston (75). In FIG. 3 and FIG. 4, the portion on the left side of the first blade (76) is a first high-pressure chamber (73) with a higher pressure, and the portion on the right side of the first blade (76) is a first low-pressure chamber (74) with a lower pressure. The second fluid chamber (82) in the second cylinder (81) is partitioned by the second blade (86) continuous to the second piston (85). In FIG. 3 and FIG. 4, the portion on the left side of the second blade (86) is a second high-pressure chamber (83) with a higher pressure, and the portion on the right side of the second blade (86) is a second low-pressure chamber (84) with a lower pressure.

The first cylinder (71) and the second cylinder (81) are positioned such that the locations of the bushings (77, 87) coincide with each other in the peripheral direction. In other words, the second cylinder (81) is placed at an angle of 0° with respect to the first cylinder (71). As described above, the first eccentric portion (79) and the second eccentric portion (89) are eccentric to the same direction with respect to the axis of the main shaft portion (38). Thus, the first blade (76) is at the most backward position closest to the outside of the first cylinder (71), when at the same time the second blade (86) is at the most backward position closest to the outside of the second cylinder (81).

The first cylinder (71) includes an inflow port (67). The inflow port (67) is open at a portion of the inner periphery of the first cylinder (71) slightly at the left of the bushings (77) in FIG. 3 and FIG. 4. The inflow port (67) can communicate with the first high-pressure chamber (73). Although not shown, the inflow pipe (35) is connected to the inflow port (67).

The second cylinder (81) includes an outflow port (68). The outflow port (68) is open at a portion of the inner periphery of the second cylinder (81) slightly at the right of the bushings (87) in FIG. 3 and FIG. 4. The outflow port (68) can communicate with the second low-pressure chamber (84). Although not shown, the outflow pipe (36) is connected to the outflow port (68).

The intermediate plate (63) includes a communication path (64). This communication path (64) penetrates the intermediate plate (63) in the thickness direction of the intermediate plate (63). One end of the communication path (64) is open at the surface of the intermediate plate (63) facing the first cylinder (71) at the right of the first blade (76). The other end of the communication path (64) is open at the surface of the intermediate plate (63) facing the second cylinder (81) at the left of the second blade (86). As shown in FIG. 2, the communication path (64) extends obliquely with respect to the thickness direction of the intermediate plate (63), and establishes communication between the first low-pressure chamber (74) and the second high-pressure chamber (83).

As described above, the first low-pressure chamber (74) of the first rotary mechanism (70) and the second high-pressure chamber (83) of the second rotary mechanism (80) communicate with each other through the communication path (64). The first low-pressure chamber (74), the communication path (64), and the second high-pressure chamber (83) form a single closed space. This closed space forms an expansion chamber (66).

The front head (61) is shaped such that a center portion of the front head (61) projects downward. A through hole is formed in the center portion of the front head (61), and the output shaft (32) is inserted in this through hole. The front head (61) forms a sliding bearing which supports the bottom of the first eccentric portion (79) of the output shaft (32). The front head (61) has a circumferential trench in a lower portion of the through hole in which the main shaft portion (38) of the output shaft (32) is inserted. This circumferential trench faces an end of the oil supply passageway (90) which is open at the outer periphery of the output shaft (32), and forms a lower oil reservoir (94).

A through hole is formed in a center portion of the rear head (62). The main shaft portion (38) of the output shaft (32) is inserted in this through hole. The rear head (62) forms a sliding bearing which supports the top of the second eccentric portion (89) of the output shaft (32).

The upper plate (65) is in the shape of a relatively thick disk, and is placed on the rear head (62). The upper plate (65) has a circular recess at a center portion of the bottom. The upper plate (65) is positioned such that the recess thereof faces the top surface of the output shaft (32). The terminal end of the oil supply pipe (41) is connected to the upper plate (65). The terminal end of the oil supply pipe (41) penetrates the upper plate (65) downward, and is open at the recess. The recess of the upper plate (65) forms an upper oil reservoir (93) for storing the refrigeration oil supplied from the oil supply pipe (41). The upper plate (65) has a recessed trench (95) at its lower surface. The recessed trench (95) extends from the rim of the upper oil reservoir (93) toward the outer periphery of the upper plate (65).

In the expansion mechanism (31), the rear head (62) has a first oil passageway (96), and the intermediate plate (63) has a second oil passageway (97), and the front head (61) has a third oil passageway (98). The first oil passageway (96) penetrates the rear head (62) in the thickness direction, and allows the terminal end of the recessed trench (95) to communicate with the bushing hole (88) of the second cylinder (81). The second oil passageway (97) penetrates the intermediate plate (63) in the thickness direction, and allows the bushing hole (88) of the second cylinder (81) to communicate with the bushing hole (78) of the first cylinder (71). In the front head (61), one end of the third oil passageway (98) is open at a portion of the upper surface of the front head (61) which faces the bushing hole (78) of the first cylinder (71). In the front head (61), the other end of the third oil passageway (98) is open at the inner periphery of the through hole in which the output shaft (32) is inserted.

In the expansion mechanism (31) of the present embodiment configured as described above, the first cylinder (71), the bushings (77) provided in the first cylinder (71), the first piston (75), and the first blade (76) form the first rotary mechanism (70). Further, the second cylinder (81), the bushings (87) provided in the second cylinder (81), the second piston (85), and the second blade (86) form the second rotary mechanism (80).

<Configuration of Power Supply Circuit>

Figure 5:
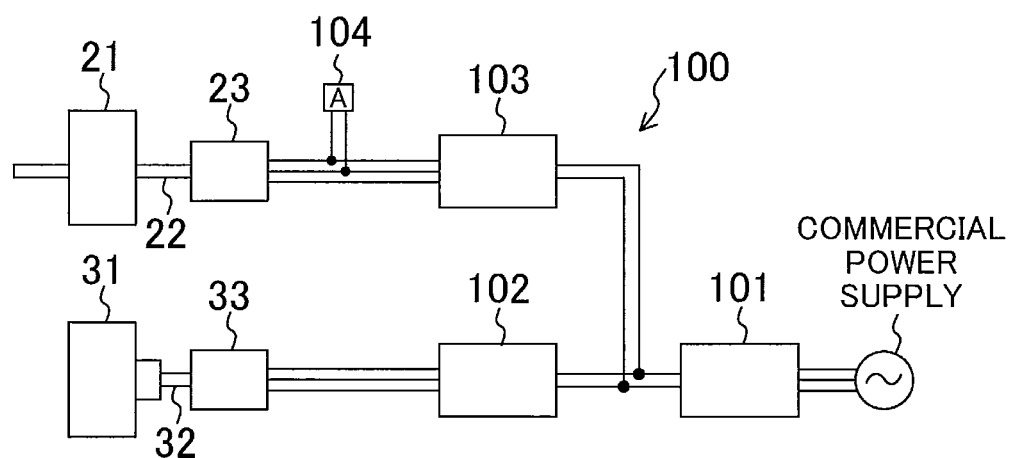
FIG. 5 is a block diagram illustrating a configuration of a power supply circuit.

A configuration of the power supply circuit (100) will be described with reference also to FIG. 5. The power supply circuit (100) according to the present embodiment is connected to the electric motor (23) of the compressor (20) and the electric generator (33) of the expander (30). The power supply circuit (100) includes a first converter (101), an inverter (102), and a second converter (103).

The first converter (101) converts alternating current power supplied from a commercial power supply to direct current power, and supplies the converted power to the inverter (102). The second converter (103) converts alternating current power generated by the electric generator (33) in the expander (30) to direct current power, and supplies the converted power to the inverter (102). The inverter (102) converts the direct current power from the first converter (101) and the second converter (103) to alternating current power, and supplies the converted power to the electric motor (23) in the compressor (20). The power supply circuit (100) is provided between the electric generator (33) and the second converter (103), and includes a current sensor (104) which detects a current value of an alternating current from the electric generator (33).

<Configuration of Controller>

The controller (110) includes a compressor control section (111), an expander control section (112), and a stop instruction section (113). The compressor control section (111) and the expander control section (112) form an equipment control section according to the present disclosure.

The stop instruction section (113) is configured to output an operation stop signal (i.e., a stop control starting signal) when a predetermined condition is satisfied during a cooling operation and a heating operation described later. The compressor control section (111) and the expander control section (112) control operations (including stop control) of the compressor (20) and the expander (30), respectively, by controlling the power supply circuit (100). The compressor control section (111) and the expander control section (112) respectively control the rotational speed of the compressor (20) and the rotational speed of the expander (30) to satisfy a predetermined operation state, during the cooling operation and the heating operation before the operation stop signal is output from the stop instruction section (113). When the operation stop signal is output from the stop instruction section (113) during the cooling operation and the heating operation, the compressor control section (111) and the expander control section (112) control the rotational speed of the compressor (20) and the rotational speed of the expander (30), respectively, so that a ratio of the rotational speed of the expander (30) to the rotational speed of the compressor (20) will be a predetermined ratio (a second ratio) greater than a rotational speed ratio (a first ratio) immediately before the output of the operation stop signal, and thereafter, stop the compressor (20) and the expander (30). That is, the compressor control section (111) and the expander control section (112) perform stop control when the operation stop signal is output. Control operations of the compressor control section (111) and the expander control section (112) will be described in detail later.

—Operation—

Operation of the air conditioner (10) will be described.

The air conditioner (10) switches between the cooling operation and the heating operation. During the cooling operation, the first four-way switching valve (12) and the second four-way switching valve (13) are set to the first state (i.e., the state indicated by solid line in FIG. 1), whereas during the heating operation, the first four-way switching valve (12) and the second four-way switching valve (13) are set to the second state (i.e., the state indicated by broken line in FIG. 1).

In both of the cooling and heating operations, the compression mechanism (21) is rotated by the electric motor (23) in the compressor (20). The compression mechanism (21) compresses the refrigerant sucked from the suction pipe (25) and discharges the refrigerant into the compressor casing (24). In the compression mechanism (21), the refrigerant is compressed to a pressure higher than the critical pressure of the carbon dioxide. The high-pressure refrigerant in the compressor casing (24) is discharged from the compressor (20) through the discharge pipe (26). During the cooling operation, the refrigerant discharged from the compressor (20) is sent to the outdoor heat exchanger (14) to dissipate heat to the outdoor air. During the heating operation, the refrigerant discharged from the compressor (20) is sent to the indoor heat exchanger (15) to dissipate heat to the indoor air, thereby heating the indoor air. The high-pressure refrigerant whose heat is dissipated in the heat outdoor heat exchanger (14) or the indoor heat exchanger (15) flows into the expander (30).

In both of the cooling and heating operations, the high-pressure refrigerant which has flowed into the expansion mechanism (31) through the inflow pipe (35) is expanded in the expander (30), thereby rotating the electric generator (33) and generating electric power. The electric power generated by the electric generator (33) is supplied to the electric motor (23) of the compressor (20) through the power supply circuit (100). Accordingly, it is possible to reduce power supplied from the commercial power supply which is necessary to drive the electric motor (23). The refrigerant expanded in the expansion mechanism (31) passes through the outflow pipe (36) to be sent from the expander (30). During the heating operation, the refrigerant from the expander (30) is sent to the outdoor heat exchanger (14) to take heat from the outdoor air and evaporate, and during the cooling operation, the refrigerant from the expander (30) is sent to the indoor heat exchanger (15) to take heat from the indoor air and evaporate, thereby cooling the indoor air. The low-pressure refrigerant evaporated in the outdoor heat exchanger (14) or the indoor heat exchanger (15) flows into the suction pipe (25) of the compressor (20).

<Operation of Expansion Mechanism>

Operation of the expansion mechanism (31) will be described in detail with reference to FIG. 4.

First, a process in which a high-pressure refrigerant in a supercritical state flows into the first high-pressure chamber (73) of the first rotary mechanism (70) will be described. When the output shaft (32) is slightly rotated from a state at a rotation angle of 0°, the portion at which the first piston (75) and the first cylinder (71) are in contact with each other passes by the opening of the inflow port (67), and a high-pressure refrigerant starts to flow from the inflow port (67) to the first high-pressure chamber (73). Then, as the rotation angle of the output shaft (32) gradually increases to 90°, 180°, and 270°, the high-pressure refrigerant flows into the first high-pressure chamber (73). The high-pressure refrigerant continues to flow into the first high-pressure chamber (73) until the rotation angle of the output shaft (32) reaches 360°.

Next, a process in which a refrigerant is expanded in the expansion mechanism (31) will be described. When the output shaft (32) is slightly rotated from a state at a rotation angle of 0°, the first low-pressure chamber (74) and the second high-pressure chamber (83) communicate with each other through the communication path (64), and a refrigerant starts to flow from the first low-pressure chamber (74) to the second high-pressure chamber (83). Then, as the rotation angle of the output shaft (32) gradually increases to 90°, 180°, and 270°, the volume of the first low-pressure chamber (74) gradually decreases, whereas the volume of the second high-pressure chamber (83) gradually increases. As a result, the volume of the expansion chamber (66) gradually increases. This increase in volume of the expansion chamber (66) continues until immediately before the rotation angle of the output shaft (32) reaches 360°. The refrigerant in the expansion chamber (66) is expanded during the process of the increase in volume of the expansion chamber (66). Due to this expansion of the refrigerant, the output shaft (32) is rotated. In this manner, the refrigerant in the first low-pressure chamber (74) continues to be expanded, and flows into the second high-pressure chamber (83) through the communication path (64).

Next, a process in which a refrigerant flows from the second low-pressure chamber (84) of the second rotary mechanism (80) will be described. The second low-pressure chamber (84) starts to communicate with the outflow port (68) at the time when the rotation angle of the output shaft (32) is 0°. That is, the refrigerant starts to flow from the second low-pressure chamber (84) to the outflow port (68). Then, the rotation angle of the output shaft (32) gradually increases to 90°, 180°, and 270°, and the expanded low-pressure refrigerant continues to flow from the second low-pressure chamber (84) until the rotation angle reaches 360°.

<Lubricating Operation of Compressor and Expander>

Lubricating operation for the compressor (20) and the expander (30) with the refrigeration oil during the above-described operations will be described.

In the compressor (20), the internal pressure of the compressor casing (24) is approximately equal to the pressure of the refrigerant discharged from the compression mechanism (21). Accordingly, the pressure of the refrigeration oil accumulated in the bottom of the compressor casing (24) is approximately equal to the pressure of the refrigerant discharged from the compression mechanism (21). On the other hand, the compression mechanism (21) sucks the low-pressure refrigerant from the suction pipe (25). Accordingly, the compression mechanism (21) has a portion which has a lower pressure than the internal pressure of the compressor casing (24). Due to this pressure difference, the refrigeration oil in the bottom of the compressor casing (24) flows into the compression mechanism (21) through the oil supply passageway in the driving shaft (22). The refrigeration oil having flowed into the compression mechanism (21) is used for lubricating the compression mechanism (21). The refrigeration oil supplied to the compression mechanism (21) is discharged into the compressor casing (24) together with the compressed refrigerant, and returns to the bottom of the compressor casing (24) again.

The pressure of the refrigerant circulating in the refrigerant circuit (11) decreases to some extent, while traveling from the compressor (20) to the expander (30). Accordingly, the pressure of the refrigerant passing through the expansion mechanism (31) is always lower than the internal pressure of the compressor casing (24). Thus, a pressure difference occurs between the internal space of the compressor casing (24) and the internal space of the expansion mechanism (31). Due to this pressure difference, the refrigeration oil accumulated in the bottom of the compressor casing (24) flows into the expansion mechanism (31) through the oil supply pipe (41). Here, the refrigeration oil having flowed into the oil supply pipe (41) is heat exchanged with the refrigerant in the suction-side pipe (16) in the cooling heat exchanger (43) and is cooled, and thereafter flows into the expansion mechanism (31).

The refrigeration oil having flowed into the expansion mechanism (31) is used for lubricating the expansion mechanism (31). Then, part of this refrigeration oil leaks from the expansion mechanism (31), and accumulates in the bottom of the expander casing (34), whereas the rest of the refrigeration oil flows from the expander (30) together with the expanded refrigerant. The refrigeration oil having flowed from the expander (30) together with the refrigerant flows in the refrigerant circuit (11) together with the refrigerant, and is sucked into the compressor (20). On the other hand, the refrigeration oil accumulated in the bottom of the expander casing (34) flows into the suction-side pipe (16) through the oil return pipe (42), and is sucked into the compressor (20) together with the refrigerant. The refrigerant flowing in the suction-side pipe (16) has the lowest pressure in the refrigerant circuit (11). That is, a pressure difference occurs between the internal space of the expander casing (34) and the suction-side pipe (16). Due to this pressure difference, the refrigeration oil in the expander casing (34) passes through the oil return pipe (42), and flows into the suction-side pipe (16). The refrigeration oil sucked into the compression mechanism (21) of the compressor (20) together with the refrigerant is discharged from the compression mechanism (21) into the internal space of the compressor casing (24) together with the compressed refrigerant, and then flows down to the bottom of the compressor casing (24).

Next, the lubricating operation in the expansion mechanism (31) will be described in detail. In the expansion mechanism (31), the refrigeration oil supplied through the oil supply pipe (41) is introduced into the upper oil reservoir (93). The refrigeration oil having flowed in the upper oil reservoir (93) is distributed among the oil supply passageway (90) of the output shaft (32), a sliding portion between the output shaft (32) and the rear head (62), and the recessed trench (95).

Part of the refrigeration oil which has flowed into the oil supply passageway (90) of the output shaft (32) is supplied to sliding portions between the eccentric portions (79, 89) and the pistons (75, 85) through the branch passageways (91, 92), and the rest of the refrigeration oil flows into the lower oil reservoir (94). The refrigeration oil having flowed into the lower oil reservoir (94) is supplied to a sliding portion between the output shaft (32) and the front head (61).

The refrigeration oil which has flowed into the recessed trench (95) passes through the first oil passageway (96), and flows into the bushing hole (88) of the second cylinder (81). Part of the refrigeration oil having flowed into the bushing hole (88) is supplied to sliding portions between the second cylinder (81) and the bushings (87), and sliding portions between the second blade (86) and the bushings (87). The rest of the refrigeration oil having flowed into the bushing hole (88) passes through the second oil passageway (97), and flows into the bushing hole (78) of the first cylinder (71). Part of the refrigeration oil having flowed into the bushing hole (78) is supplied to sliding portions between the first cylinder (71) and the bushings (77), and sliding portions between the first blade (76) and the bushings (77). The rest of the refrigeration oil having flowed into the bushing hole (78) is supplied to a gap between the front head (61) and the output shaft (32) through the third oil passageway (98).

<Control of Compressor and Expander>

Operation control of the compressor (20) and the expander (30) during the above-described operations will be described with reference to FIG. 6.

Figure 6:
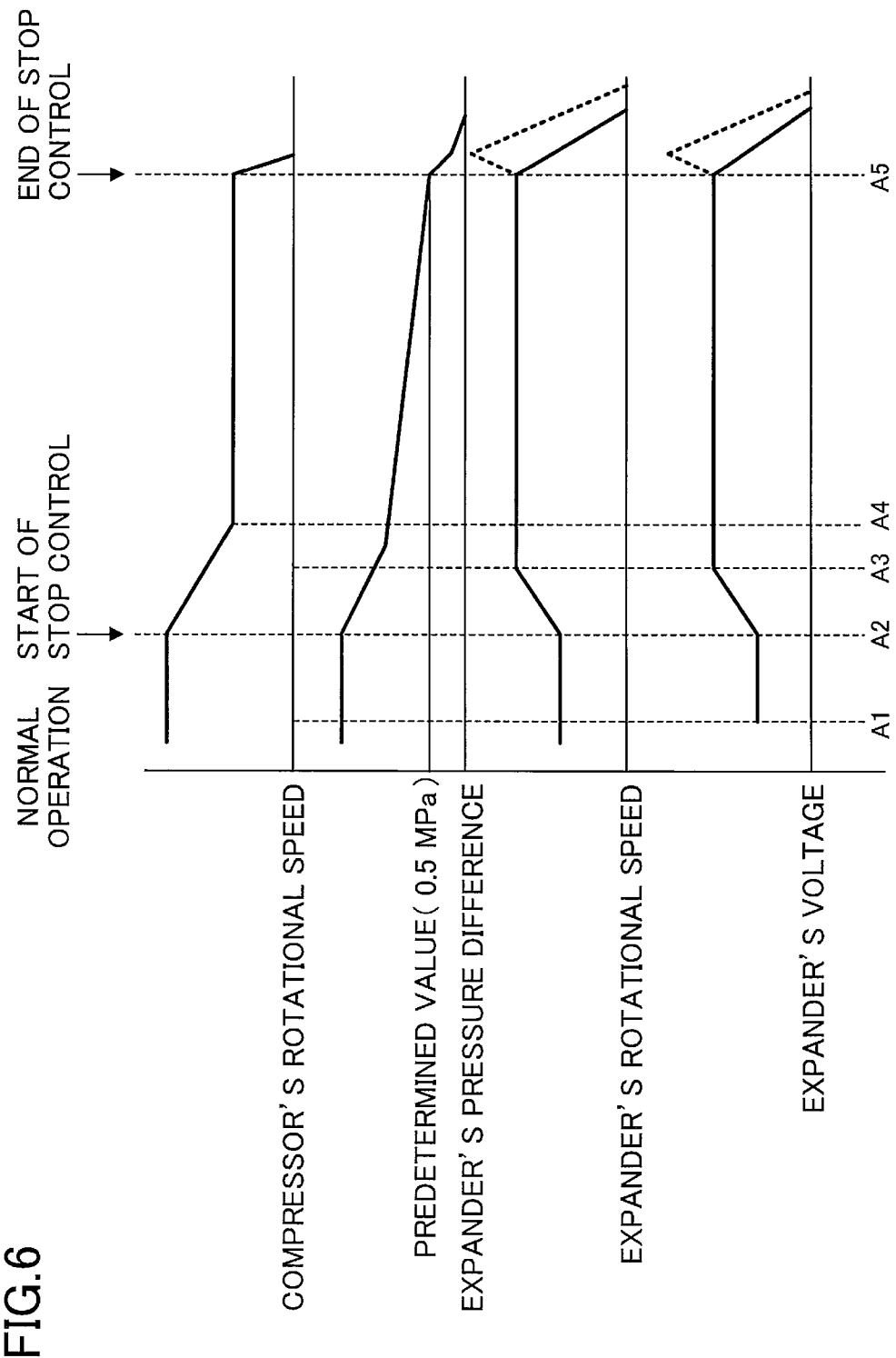
FIG. 6 is a time chart showing a stop control operation according to the first embodiment.

The operation control of the compressor (20) and the expander (30) includes "normal control" and "stop control." The "normal control" is performed during a period from start of operation to the output of an operation stop signal from the stop instruction section (113) (e.g. a period of normal operation including A1 shown in FIG. 6), and the "stop control" is performed during a period from the output of the operation stop signal to stop of operation (e.g. a period from A2-A5 in FIG. 6). The stop instruction section (113) outputs an operation stop signal when a predetermined condition is satisfied in each of the operations as described above (A2 in FIG. 6). The predetermined condition includes, for example, the time when an operation stop button of a remote is pressed, stop with a timer, the time when a thermostat is off, etc., which are not emergency situations.

(Normal Control)

The normal control will be described. In this normal control, the compressor control section (111) and the expander control section (112) control the rotational speed of the compressor (20) and the rotational speed of the expander (30), respectively, so that a predetermined operation state will be satisfied.

The compressor control section (111) controls switching of the inverter (102) of the power supply circuit (100), thereby controlling the rotational speed of the electric motor (23). Accordingly, the rotational speed Rc of the compressor (20) is controlled. The expander control section (112) controls switching of the second converter (103) of the power supply circuit (100), thereby controlling the rotational speed of the electric generator (33). More specifically, the expander control section (112) estimates a magnetic pole position of the electric generator (33) from a current value detected by the current sensor (104), and based on the estimated magnetic pole position and the current value, the expander control section (112) controls the rotational speed of the electric generator (33). Accordingly, the rotational speed Re of the expander (30) is controlled.

(Stop Control)

The stop control will be described. In this stop control, the rotational speed Rc of the compressor (20) and the rotational speed Re of the expander (30) are controlled so that a ratio (Re/Rc) of the rotational speed Re of the expander (30) to the rotational speed Rc of the compressor (20) will be a predetermined second ratio greater than a first ratio which is a rotational speed ratio immediately before start of the stop control.

Specifically, when the operation stop signal is output, the compressor control section (111) outputs a signal which changes the rotational speed Rc of the compressor (20) to a predetermined rotational speed Rc1 (e.g. 30 rps) lower than the rotational speed during normal control, and the expander control section (112) outputs a signal which changes the rotational speed Re of the expander (30) to a predetermined rotational speed Rc1 (e.g. 70 rps) higher than the rotational speed during the normal control (A2 in FIG. 6). As a result, the rotational speed Rc of the compressor (20) gradually decreases, and the rotational speed Re of the expander (30) gradually increases. As the rotational speed Rc of the compressor (20) decreases, the high pressure in the refrigerant circuit (11) decreases, whereas the low pressure increases. As a result, a difference between the high pressure and the low pressure is reduced. Also, as the rotational speed Re of the expander (30) increases, the high pressure in the refrigerant circuit (11) decreases, whereas the low pressure increases. As a result, a difference between the high pressure and the low pressure is reduced. That is, a difference between the inlet pressure and the outlet pressure in the expander (30) (i.e., a difference between a value detected by the inlet pressure sensor (54) and a value detected by the outlet pressure sensor (55)) is reduced. Here, as the rotational speed Re of the expander (30) increases, the voltage of the expander (30) (i.e., the voltage of the electric generator (33)) increases. If the rotational speed Rc of the compressor (20) is already equal to or lower than the predetermined rotational speed Rc1 at the time of output of the operation stop signal, the rotational speed Rc is maintained as it is. If the rotational speed Re of the expander (30) is equal to or higher than the predetermined rotational speed Re1 at the time of output of the operation stop signal, the rotational speed Re is maintained as it is.

When the rotational speed Rc of the compressor (20) is decreased to the predetermined rotational speed Rc1, the rotational speed Rc of the compressor (20) is maintained at that rotational speed (A4 in FIG. 6). Further, when the rotational speed Re of the expander (30) is increased to the predetermined rotational speed Re1, the rotational speed Re of the expander (30) is maintained at that rotational speed (A3 in FIG. 6). A ratio of the predetermined rotational speed Re1 to the predetermined rotational speed Rc1 (Re1/Rc1) is the second ratio mentioned above. The pressure difference in the expander (30) continues to decrease also during the period in which the rotational speeds Rc, Re of the compressor (20) and the expander (30) are maintained.

When the pressure difference in the expander (30) is decreased to a predetermined value (e.g. 0.5 MPa), the compressor control section (111) and the expander control section (112) respectively output signals which make the rotational speeds Rc, Re of the compressor (20) and the expander (30) zero (A5 in FIG. 6). Then, the rotational speed Rc of the compressor (20) gradually decreases, and the compressor (20) stops. On the other hand, the difference between the inlet pressure and the outlet pressure in the expander (30) is sufficiently small at the time of output of the signal which makes the rotational speed Re of the expander (30) zero. Here, if the difference between the inlet pressure and the outlet pressure in the expander (30) remains to some extent, the expander (30) is accelerated by its own pressure difference and is rotated at a high speed, that is, the rotational speed suddenly increases, as indicated by "Expander's Rotational Speed" in broken line in FIG. 10. However, in the present embodiment, the pressure difference in the expander (30) is sufficiently reduced, and therefore, the rotational speed Re of the expander (30) is gradually reduced, and the expander (30) is stopped without being rotated at a high speed. Further, since the expander (30) is not rotated at a high speed, the voltage of the expander (30) (i.e., the voltage of the electric generator (33)) does not increase and gradually decreases to zero.

In the stop control according to the present embodiment, the rotational speed Rc of the compressor (20) is reduced and the rotational speed Re of the expander (30) is increased, thereby changing the radio between these rotational speeds (Re/Rc) to the second ratio. Instead, however, the rotational speed Rc of the compressor (20) may be maintained at the rotational speed of the period of the normal control, and the rotational speed Re of the expander (30) may be increased to a predetermined value, thereby changing the ratio between the rotational speeds (Re/Rc) to the second ratio. Alternatively, the rotational speed Re of the expander (30) may be maintained at the rotational speed of the period of the normal control, and the rotational speed Rc of the compressor (20) may be reduced to a predetermined value, thereby changing the ratio between the rotational speeds (Re/Rc) to the second ratio. That is, in the stop control according to the present embodiment, the ratio between the rotational speed of the compressor (20) and the rotational speed of the expander (30) (Re/Rc) may be changed to the second ratio by controlling the rotational speed of at least one of the compressor (20) or the expander (30).

In the stop control according to the present embodiment, a difference between the values detected by the inlet pressure sensor (54) and the outlet pressure sensor (55) is used as a pressure difference of the expander (30). Instead, however, a difference between values detected by the high pressure sensor (51) and the low pressure sensor (52) may be used as a pressure difference of the expander (30).

Advantages of Embodiment

In the present embodiment, during a normal operation period before output of an operation stop signal, the rotational speed of the compressor (20) and the rotational speed of the expander (30) are controlled so that a predetermined operation state is satisfied (i.e., normal control), and when the operation stop signal is output, the rotational speed of the compressor (20) and the rotational speed of the expander (30) are controlled so that the ratio of the rotational speed of the expander (30) to the rotational speed of the compressor (20) will be a predetermined ratio (a second ratio) greater than a rotational speed ratio (a first ratio) immediately before the output of the operation stop signal (i.e., stop control). As a result, the pressure difference in the expander (30) can be reduced more in the stop control than in the normal control with reliability. Thus, the pressure difference in the expander (30) in the stop operation can be smaller, compared to the ease in which the compressor (20) and the expander (30) are stopped while maintaining the ratio between the rotational speeds in the normal control period. Accordingly, it is possible to avoid the situation in which the expander (30) is accelerated and rotated at a high speed in the stop operation due to the pressure difference in the expander (30). Thus, it is possible to prevent the expander (30) from being damaged due to high speed rotation. In other words, it is possible to avoid the situation in which the expander (30) is rotated at a very high speed which may result in causing damage to the expander (30). Further, it is possible to prevent electronic equipment from being damaged by a voltage increase in the power supply circuit (100) due to a situation where electric power generated by the electric generator (33) as a result of high-speed rotation of the expander (30) is not used in the power supply circuit (100).

In the stop control according to the present embodiment, the rotational speeds Rc, Re of the compressor (20) and the expander (30) are controlled, and after the pressure difference of the expander (30) is reduced to a predetermined value, the compressor (20) and the expander (30) are stopped. Accordingly, it is possible to reliably reduce the pressure difference of the expander (30) to a pressure difference at which no high-speed rotation of the expander (30) occurs. That is, the pressure in the refrigerant circuit (11) can be almost equalized. As a result, it is possible to reliably prevent the expander (30) from being rotated at a high speed due to the pressure difference in the stop operation.

In the stop control according to the present embodiment, the rotational speed Rc of the compressor (20) is reduced and the rotational speed Re of the expander (30) is increased. Thus, the pressure difference in the expander (30) can be reduced faster, compared to the case in which only the rotational speed Rc of the compressor (20) is reduced or the case in which only the rotational speed Re of the expander (30) is increased. As a result, it is possible to reduce the time necessary for the stop control.

Second Embodiment

Figure 7:
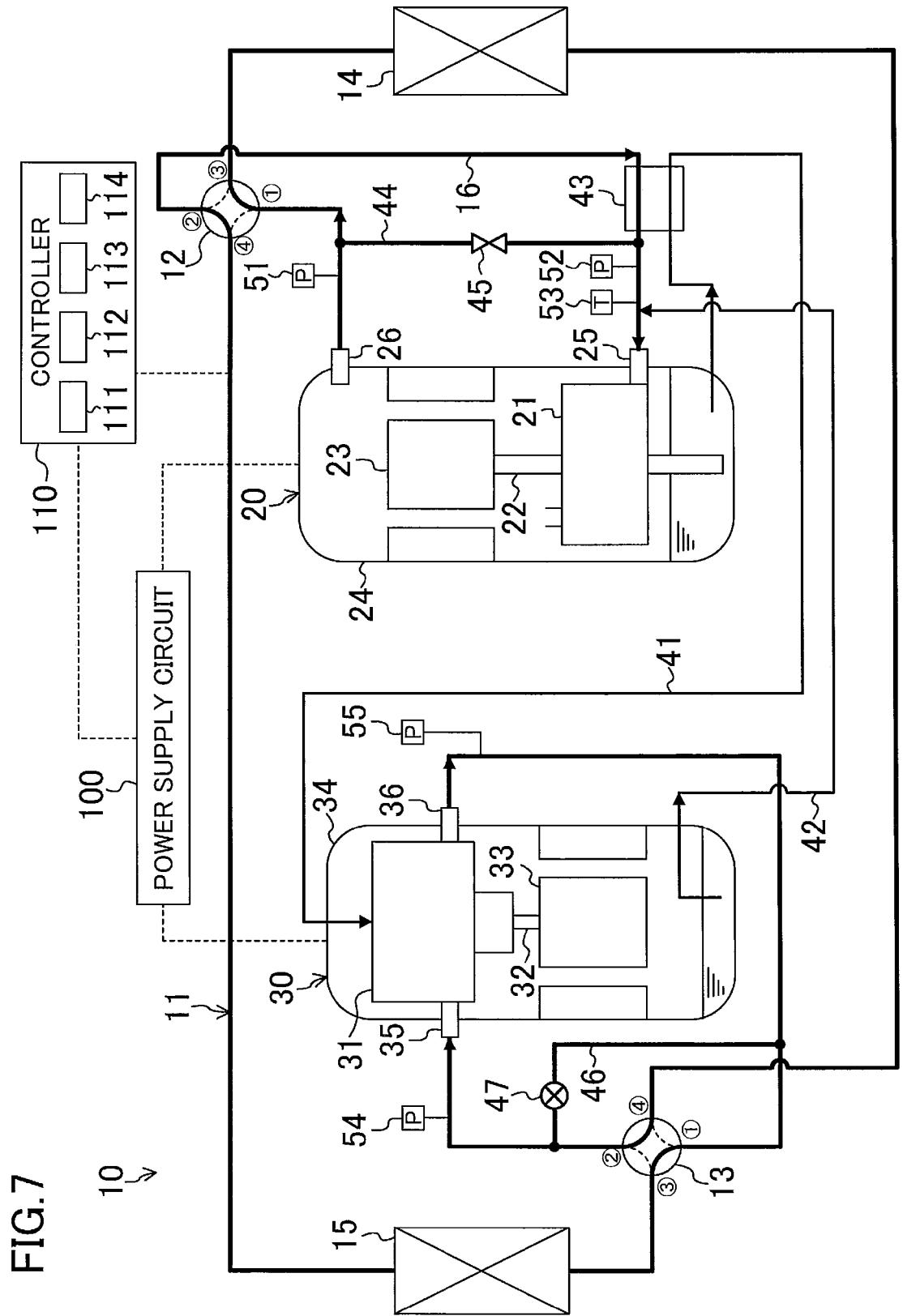
FIG. 7 is a circuit diagram illustrating a configuration of an air conditioner according to the second embodiment.

The second embodiment of the present disclosure will be described. As shown in FIG. 7, in the present embodiment, the refrigerant circuit (11) of the first embodiment includes two bypass pipes (44, 46) and two bypass valves (45, 47). The stop control in the first embodiment is changed in the present embodiment. The controller (110) of the present embodiment further includes a valve control section (114).

One end of the first bypass pipe (44) is connected to a pipe between the discharge pipe (26) of the compressor (20) and the first four-way switching valve (12). The other end of the first bypass pipe (44) is connected to the suction-side pipe (16) at a position between the cooling heat exchanger (43) and the oil return pipe (42). The first bypass valve (45) forms an open/close valve, and is provided at the first bypass pipe (44). One end of the second bypass pipe (46) is connected to a pipe between the inflow pipe (35) of the expander (30) and the second four-way switching valve (13), and the other end of the second bypass pipe (46) is connected to a pipe between the outflow pipe (36) of the expander (30) and the second four-way switching valve (13). The second bypass valve (47) forms a flow rate adjusting valve, and is provided at the second bypass pipe (46). The first bypass valve (45) and the second bypass valve (47) are controlled by the valve control section (114).

In the stop control according to the present embodiment, when an operation stop signal is output (A2 in FIG. 6), the rotational speeds of the compressor (20) and the expander (30) are controlled so that the ratio between the rotational speeds of the compressor (20) and the expander (30) (Re/Rc) will be the second ratio, and the first bypass valve (45) and the second bypass valve (47) are opened by the valve control section (114). Due to the opening of the first bypass valve (45), the outlet side and the inlet side of the compressor (20), that is, the highest pressure portion and the lowest pressure portion in the refrigerant circuit (11) communicate with each other. Thus, the difference between the high pressure and the low pressure in the refrigerant circuit (11) instantaneously decreases. Further, due to the opening of the second bypass valve (47), the inflow side and the outflow side of the expander (30) communicate with each other. Thus, the pressure difference in the expander (30) instantaneously decreases. Accordingly, by opening the two bypass valves (45, 47), the pressure equalization is enhanced in the refrigerant circuit (11). As a result, the pressure difference in the expander (30) can be instantaneously reduced to a predetermined value, which leads to a further reduction of time necessary for the stop control. The other configurations, operations and advantages are similar to those in the first embodiment.

In the stop control according to the present embodiment, one of the two bypass valves (45, 47) may be opened. If the second bypass valve (47) is opened, the degree of opening of the second bypass valve (47) may be gradually increased. By gradually increasing the degree of opening of the second bypass valve (47), it is possible to prevent a liquid refrigerant on the inflow side of the expander (30) from passing through the second bypass pipe (46) and flowing into the indoor heat exchanger (15) or the outdoor heat exchanger (14) serving as an evaporator at once. As a result, it is possible to avoid so-called liquid back-flow in which the liquid refrigerant is not completely evaporated by the evaporator and is sucked into the compressor (20).

Third Embodiment

Figure 8:
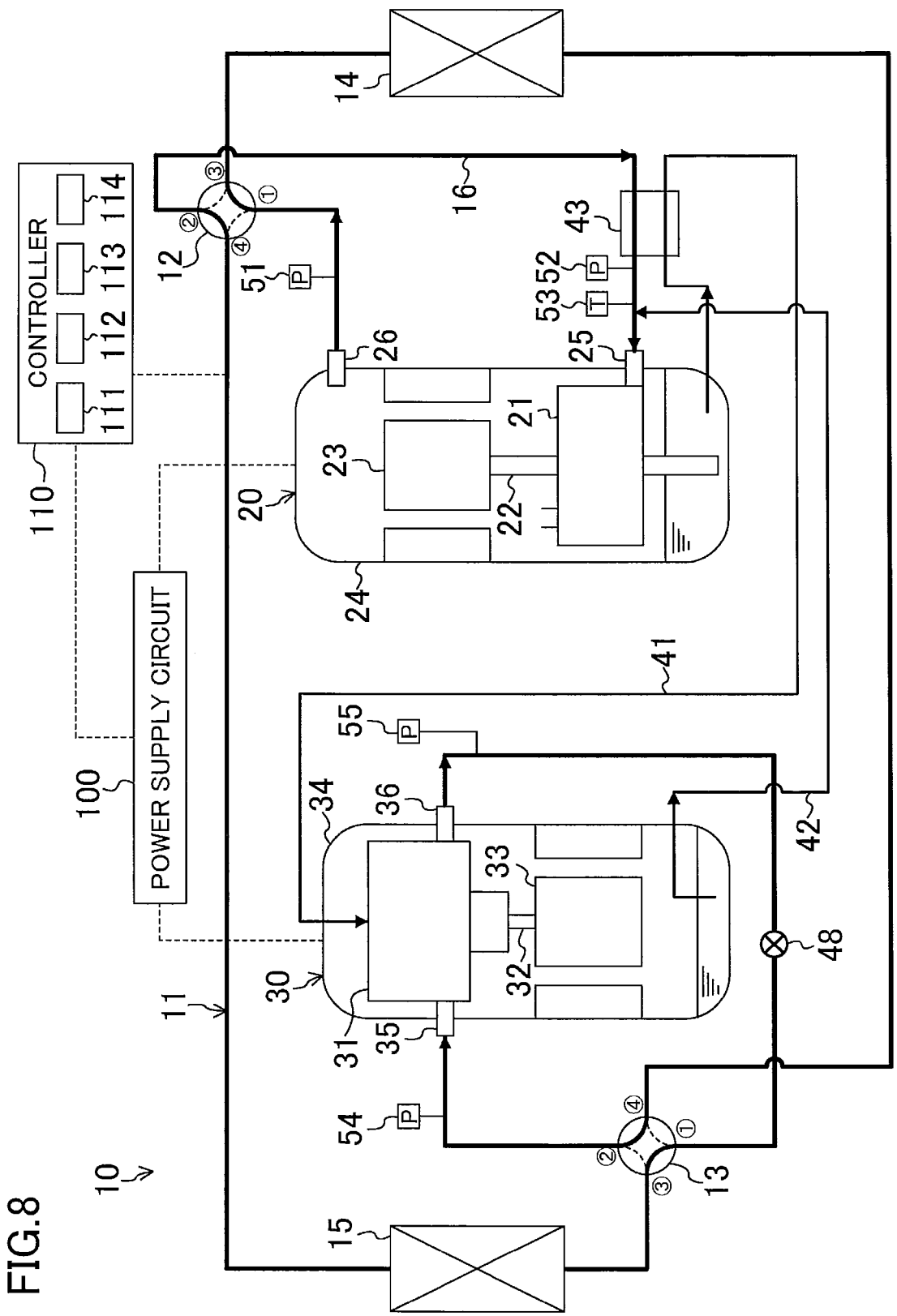
FIG. 8 is a circuit diagram illustrating a configuration of an air conditioner according to the third embodiment.

The third embodiment of the present disclosure will be described. As shown FIG. 8, in the present embodiment, the refrigerant circuit (11) of the first embodiment includes an expansion valve (48). The stop control in the first embodiment is changed in the present embodiment. The controller (110) of the present embodiment further includes a valve control section (114).

The expansion valve (48) forms a flow rate adjusting valve, and is provided at a pipe between the outflow pipe (36) of the expander (30) and the second four-way switching valve (13). That is, the expansion valve (48) is provided at an outlet-side pipe. Further, the expansion valve (48) is positioned at a downstream side of the outlet pressure sensor (55).

Figure 9:
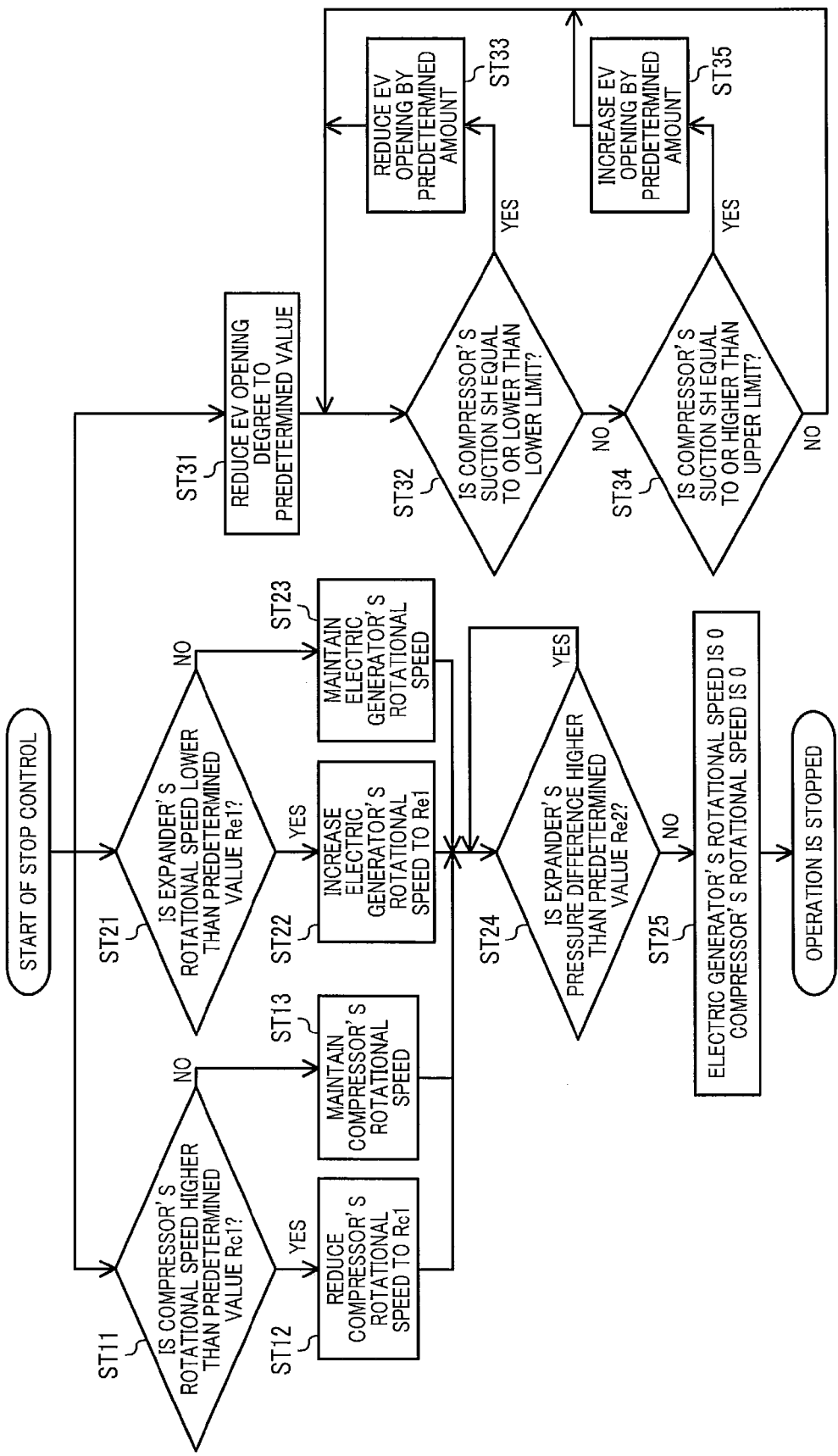
FIG. 9 is a flow chart showing a stop control operation according to the third embodiment.

In the stop control according to the present embodiment, the rotational speeds of the compressor (20) and the expander (30) are controlled so that the ratio between the rotational speeds of the compressor (20) and the expander (30) (Re/Rc) will be the second ratio, and the degree of opening of the expansion valve (48) is controlled. Specifically, the steps are performed as illustrated in the flowchart of FIG. 9 and the time chart of FIG. 10.

When an operation stop signal is output, the compressor control section (111) determines whether the rotational speed Re of the compressor (20) is higher than a predetermined value Rc1 or not (ST11). If the rotational speed Rc of the compressor (20) is higher than the predetermined value Rc1, the compressor control section (111) decreases the rotational speed Rc of the compressor (20) to the predetermined value Rc1 (ST12, B2 in FIG. 10). On the other hand, when an operation stop signal is output, the expander control section (112) determines whether the rotational speed Re of the expander (30) is lower than a predetermined value Re1 or not (ST21). If the rotational speed Re of the expander (30) is lower than the predetermined value Re1, the expander control section (112) increases the rotational speed Re of the expander (30) to the predetermined value Re1 (ST22, B2 in FIG. 10). If the rotational speed Rc of the compressor (20) is equal to or lower than the predetermined value Rc1, the rotational speed Rc of the compressor (20) is maintained at the rotational speed of during the normal control (B1 in FIG. 10, that is, the rotational speed Rc immediately before output of the operation stop signal) (ST13). If the rotational speed Re of the expander (30) is equal to or higher than the predetermined value Re1, the rotational speed Re of the expander (30) is maintained at the rotational speed of during the normal control (B1 in FIG. 10, that is, the rotational speed Re immediately before output of the operation stop signal) (ST23). When the rotational speed Rc of the compressor (20) is reduced to the predetermined value Rc1, that rotational speed is maintained (B4 in FIG. 10). When the rotational speed Re of the expander (30) is increased to the predetermined value Re1, that rotational speed is maintained (B3 in FIG. 10). The ratio between these rotational speeds Re1/Rc1 is the second ratio. Further, when an operation stop signal is output, the valve control section (114) reduces the degree of opening of the expansion valve (48) to a predetermined value (ST31, B2 in FIG. 10). That is, when the operation stop signal is output, the degree of opening of the expansion valve (48) becomes smaller than the degree of opening during normal operation.

As shown in FIG. 10, as the rotational speed Rc of the compressor (20) is reduced and the rotational speed Re of the expander (30) is increased, the high pressure in the refrigerant circuit (11) (i.e., a value detected by the high pressure sensor (51)) and the inlet pressure of the expander (30) (i.e., a value detected by the inlet pressure sensor (54)) are reduced in almost the same manner. On the other hand, as the degree of opening of the expansion valve (48) is reduced, the low pressure in the refrigerant circuit (11) (i.e., a value detected by the low pressure sensor (52)) is not much increased, but the outlet pressure of the expander (30) (i.e., a value detected by the outlet pressure sensor (55)) is significantly increased. Accordingly, the difference between the inlet pressure and the outlet pressure in the expander (30) is significantly reduced. Since it is not only that the rotational speed Rc of the compressor (20) is reduced and the rotational speed Re of the expander (30) is increased, but also that the degree of opening of the expansion valve (48) positioned at a downstream side of the expander (30) is reduced, the amount of circulation of the refrigerant is significantly increased between the outflow side of the expander (30) and the expansion valve (48), but is not much increased between the expansion valve (48) and the inlet side of the compressor (20). By controlling the rotational speeds of the compressor (20) and the expander (30) and reducing the degree of opening of the expansion valve (48) as described above, it is possible to reduce the inlet pressure and significantly increase the outlet pressure in the expander (30). As a result, the pressure difference in the expander (30) can be instantaneously reduced. Further, since the pressure difference in the expander (30) can be reduced without a sudden increase of the low pressure in the refrigerant circuit (11) by reducing the degree of opening of the expansion valve (48), it is possible to prevent the refrigerant from not being completely evaporated by the indoor heat exchanger (15) or the outdoor heat exchanger (14) serving as an evaporator, and flowing into the compressor (20). As a result, it is possible to avoid so-called liquid back-flow in the compressor (20). If the rotational speed Re of the expander (30) is increased without reducing the degree of opening of the expansion valve (48), the low pressure in the refrigerant circuit (11) suddenly increases, and the refrigerant is not easily evaporated in the evaporator. In the present embodiment, such a situation is prevented.

Then, it is determined whether the difference between the inlet pressure and the outlet pressure of the expander (30) is larger than a predetermined value Re2 (e.g. 0.5 MPa) (ST24). If the difference is equal to or smaller than the predetermined value Re2, the compressor control section (111) and the expander control section (112) output signals which respectively make the rotational speeds Rc, Re of the compressor (20) and the expander (30) zero (ST25, B5 in FIG. 10). Then, the rotational speed Rc of the compressor (20) gradually decreases, and the compressor (20) stops. On the other hand, the pressure difference between the inlet pressure and the outlet pressure of the expander (30) is sufficiently small. Thus, even if the signal which makes the rotational speed Re of the expander (30) zero is output, the expander (30) is not accelerated nor rotated at a high speed due to the pressure difference. Accordingly, the rotational speed Re of the expander (30) gradually decreases, and the expander (30) stops.

On the other hand, the valve control section (114) reduces the degree of opening of the expansion valve (48) to a predetermined value (ST31), and thereafter controls the degree of opening of the expansion valve (48) according to suction superheat SH of the compressor (20) until the pressure difference in the expander (30) is reduced to the predetermined value Re2. Here, the suction superheat SH is a value obtained by subtracting a saturation temperature corresponding to a suction pressure detected by the low pressure sensor (52) from a temperature of sucked refrigerant detected by the suction temperature sensor (53). Specifically, the valve control section (114) determines whether the suction superheat SH is equal to or lower than a lower limit (e.g. 2° C.) (ST32), and if the suction superheat SH is equal to or lower than the lower limit, the valve control section (114) further reduces the degree of opening of the expansion valve (48) by a predetermined amount (ST33). As a result, the suction superheat SH increases. Further, if it is determined that the suction superheat SH is higher than the lower limit in ST32, the valve control section (114) determines whether the suction superheat SH is equal to or higher than an upper limit (e.g. 20° C.) (ST34). If the suction superheat SH is equal to or higher than the upper limit, the valve control section (114) increases the degree of opening of the expansion valve (48) by a predetermined amount (ST35). As a result, the suction superheat SH decreases. Accordingly, after the degree of opening of the expansion valve (48) is reduced to the predetermined value when the operation stop signal is output, the degree of opening of the expansion valve (48) is controlled such that the suction superheat SH is in a given range. Thus, a gas refrigerant in a superheat state can be sucked into the compressor (20), and as a result, it is possible to avoid so-called liquid back-flow in the compressor (20) with reliability.

As described above, in the stop control according to the present embodiment, liquid back-flow in the compressor (20) is avoided, and the outlet pressure of the expander (30) is significantly increased, thereby making it possible to instantaneously decrease the pressure difference in the expander (30), by reducing the degree of opening of the expansion valve (48). Accordingly, it is possible to prevent the compressor (20) from being damaged, and possible to further reduce the time necessary for the stop control. Moreover, since the degree of opening of the expansion valve (48) is controlled such that the suction superheat SH is in a given range, the liquid back-flow can be avoided with increased reliability. The other configurations, operations and advantages are similar to those in the first embodiment.

In the present embodiment, the expansion valve (48) is positioned at a downstream side of the expander (30), but instead, the expansion valve (48) may be positioned at an upstream side of the expander (30). Specifically, the expansion valve (48) is provided at a pipe between the inflow pipe (35) of the expander (30) and the second four-way switching valve (13) (i.e., an inlet-side pipe of the expander (30) according to the present disclosure). In this case, the degree of opening of the expansion valve (48) is reduced to a predetermined value when an operation stop signal is output. If this is done, the high pressure in the refrigerant circuit (11) is not much reduced, but the inlet pressure of the expander (30) significantly decreases. Accordingly, in this case as well, the pressure difference in the expander (30) can be instantaneously reduced without a sudden increase of the low pressure in the refrigerant circuit (11). As a result, the liquid back-flow can be avoided.

In the present embodiment, the expansion valve (48) may be replaced with a decompression mechanism, such as a capillary tube.

INDUSTRIAL APPLICABILITY

As described above, the present disclosure is useful as a refrigeration system having a compressor and an expander as separate components.

DESCRIPTION OF REFERENCE CHARACTERS 10 air conditioner (refrigeration system)
11 refrigerant circuit
20 compressor
21 compression mechanism
23 electric motor
30 expander
31 expansion mechanism
32 output shaft
33 electric generator
44 first bypass pipe (bypass pipe)
45 first bypass valve (open/close valve)
46 second bypass pipe (bypass pipe)
47 second bypass valve (open/close valve)
48 expansion valve (flow rate adjusting valve)
111 compressor control section (equipment control section)
112 expander control section (equipment control section)
113 stop instruction section
114 valve control section

The invention claimed is:

1. A refrigeration system, comprising:
a refrigerant circuit including a compressor and an expander which expands a refrigerant and generates power, for circulating the refrigerant and performing a refrigeration cycle, wherein
the refrigeration system includes
a stop instruction section which outputs an operation stop signal under a predetermined condition, and
an equipment control section which, when the operation stop signal is output from the stop instruction section, controls a rotational speed of at least one of the compressor or the expander such that a ratio of a rotational speed of the expander to a rotational speed of the compressor will be a second ratio higher than a first ratio that is a ratio of a rotational speed of the expander to a rotational speed of the compressor in an operation before the output of the operation stop signal from the stop instruction section, and thereafter stops the compressor and the expander.

2. The refrigeration system of claim 1, wherein
the equipment control section is configured to perform rotational speed control in which the rotational speed of the compressor is reduced and the rotational speed of the expander is maintained or increased when the operation stop signal is output from the stop instruction section, and thereafter stop the compressor and the expander.

3. The refrigeration system of claim 1, wherein
the equipment control section is configured to perform rotational speed control in which the rotational speed of the compressor is maintained and the rotational speed of the expander is increased when operation stop signal is output from the stop instruction section, and thereafter stop the compressor and the expander.

4. The refrigeration system of any one of claims 1-3, wherein
the equipment control section is configured to control the rotational speed of at least one of the compressor or the expander when the operation stop signal is output from the stop instruction section, and thereafter stop the compressor and the expander when a difference between an inlet pressure and an outlet pressure of the refrigerant in the expander reaches a predetermined value or lower.

5. The refrigeration system of any one of claims 1-3, wherein
the refrigerant circuit includes a flow rate adjusting valve provided at an inlet-side pipe or an outlet-side pipe of the expander, and
the refrigeration system includes a valve control section which reduces a degree of opening of the flow rate adjusting valve when the operation stop signal is output from the stop instruction section.

6. The refrigeration system of any one of claims 1-3, wherein
the refrigerant circuit includes a bypass pipe provided with an open/close valve and connecting between an inlet-side pipe and an outlet-side pipe of the expander, and
the refrigeration system includes a valve control section which opens the open/close valve when the operation stop signal is output from the stop instruction section.

7. The refrigeration system of any one of claims 1-3, wherein
the refrigerant circuit includes a bypass pipe provided with an open/close valve and connecting between an outlet-side pipe and a suction-side pipe of the compressor, and
the refrigeration system includes a valve control section which opens the open/close valve when the operation stop signal is output from the stop instruction section.

8. The refrigeration system of any one of claims 1-3, wherein
the compressor includes a compression mechanism for compressing the refrigerant, and an electric motor for driving the compression mechanism,
the expander includes an expansion mechanism which expands the refrigerant having flowed into the expansion mechanism and generates power, and an electric generator coupled to the expansion mechanism with an output shaft, and driven by the power generated by the expansion mechanism, and
the electric generator is configured to supply generated electric power to the electric motor of the compressor.

* * * * *